(12) United States Patent
Taniguchi et al.

(10) Patent No.: US 7,666,975 B2
(45) Date of Patent: Feb. 23, 2010

(54) POLYKETONE AND METHOD FOR PRODUCING THE SAME

(75) Inventors: Ryu Taniguchi, Nobeoka (JP); Jinichiro Kato, Nobeoka (JP); Takashi Komatsu, Kurashiki (JP)

(73) Assignee: Asahi Kasei Fibers Corporation, Osaka (JP)

( * ) Notice: Subject to any disclaimer, the term of this patent is extended or adjusted under 35 U.S.C. 154(b) by 0 days.

(21) Appl. No.: 11/840,125

(22) Filed: Aug. 16, 2007

(65) Prior Publication Data

US 2008/0262189 A1    Oct. 23, 2008

Related U.S. Application Data

(63) Continuation of application No. 11/320,531, filed on Dec. 29, 2005, now abandoned, which is a continuation of application No. 10/500,190, filed as application No. PCT/JP02/13451 on Dec. 24, 2002, now abandoned.

(30) Foreign Application Priority Data

Dec. 26, 2001  (JP) ............................. 2001-393617
Mar. 14, 2002  (JP) ............................. 2002-069569

(51) Int. Cl.
C08G 4/00      (2006.01)
C08G 2/16      (2006.01)

(52) U.S. Cl. .................. 528/220; 528/392; 528/486; 528/495; 528/499; 528/502 C; 528/503

(58) Field of Classification Search ............... 528/220, 528/392, 486, 495, 499, 502 C, 503
See application file for complete search history.

(56) References Cited

U.S. PATENT DOCUMENTS

| | | | |
|---|---|---|---|
| 4,835,250 A | 5/1989 | Drent | |
| 4,839,437 A | 6/1989 | Gergen et al. | |
| 4,843,144 A | 6/1989 | Van Broekhoven et al. | |
| 4,855,400 A | 8/1989 | Van Broekhoven et al. | |
| 4,855,401 A | 8/1989 | Van Broekhoven | |
| 5,340,787 A | 8/1994 | Keijsper | |

FOREIGN PATENT DOCUMENTS

| | | |
|---|---|---|
| EP | 0 319 083 | 6/1989 |
| EP | 0 361 584 | 4/1990 |
| EP | 0 456 306 B1 | 11/1991 |
| EP | 0 285 218 | 10/1999 |
| EP | 1116752 A1 | 7/2001 |
| JP | 59-197427 | 11/1984 |
| JP | 1-201333 | 8/1989 |
| JP | 2-16155 | 1/1990 |
| JP | 2-115223 | 4/1990 |
| JP | 4-228613 | 8/1992 |
| JP | 2000-345431 | 12/2000 |
| JP | 2001-98066 | 4/2001 |
| JP | 2002-317044 | 10/2002 |
| WO | WO 99/18143 | 4/1999 |
| WO | WO 00/68296 | 11/2000 |
| WO | WO 01/02463 A1 | 1/2001 |

OTHER PUBLICATIONS

Lommerts, Bert J., "The influence of catalyst remnants on thermal degradation during melt processing of high melting ethylene-carbon monoxide copolymers," Polymer, 42, pp. 6283-6287, (2001).
Drent, E. et al., "Palladium-Catalyzed Alternating Copolymerization of Alkenes and Carbon Monoxide," Chemical Review, 99, pp. 663-681, (1996).
Drent et al., "Efficient Palladium Catalysts for the Copolymerization of Carbon Monoxide with Olefins to Product Perfectly Alternating Polyketones," Journal of Organometallic Chemistry, 417, pp. 235-251 (1991).
Supplementary European Search Report dated Jan. 20, 2006.

*Primary Examiner*—Duc Truong
(74) *Attorney, Agent, or Firm*—Finnegan, Henderson, Farabow, Garrett & Dunner, L.L.P.

(57) ABSTRACT

There is provided a polyketone comprising repeating units, 95-100 mole % of which are 1-oxotrimethylene and having an intrinsic viscosity of 2.5-20 dl/g, wherein the content of Pd element is 0-20 ppm, terminal structures include an alkyl ester group (terminal group A) and an alkyl ketone group (terminal group B), and the equivalent ratio of terminal group A/terminal group B is 0.1-8.0. The polyketone of the present invention can be used in any forms, such as fibers and films, and can be applied to a wide variety of the uses such as clothing, reinforcing materials for rubbers, resins, cements, and optical fibers, electronic materials, battery materials, civil engineering materials, medical materials, daily commodities, fishery materials, and packaging materials.

25 Claims, No Drawings

POLYKETONE AND METHOD FOR PRODUCING THE SAME

This is a continuation of application Ser. No. 11/320,531, filed Dec. 29, 2005 now abandoned, which is a continuation of application Ser. No. 10/500,190, filed on Jun. 25, 2004 now abandoned which was a § 371 of PCT/JP02/13451 filed Dec. 24, 2002 the contents of all of which are incorporated herein by reference.

TECHNICAL FIELD

The present invention relates to a polyketone which is high in molecular weight, can exhibit ultra-high strength when made into fibers, has excellent heat stability and chemical resistance, and is excellent in stability of quality during long-term-storage, processability at high temperatures and in wet heat, and stability as a dope in inorganic salt solvents, as well as a method for producing the polyketone.

BACKGROUND ART

Polyketones having a structure in which repeating units derived from carbon monoxide and repeating units derived from ethylenically unsaturated compounds are substantially alternately connected with each other are excellent in mechanical properties and thermal properties and high in wear resistance, chemical resistance and gas barrier properties, and thus are expected to be used in various fields. For example, polyketones are useful material as resins, fibers and films having high strength and high heat resistance. Particularly, when a high molecular weight polyketone having an intrinsic viscosity of 2.5 dl/gd or higher is used as a raw material, fibers or films having very high strength and elastic modulus can be obtained. These fibers or films are expected to be used in the wide variety of applications of constructional materials and industrial materials, e.g., belts, hoses, rubber reinforcing materials such as tire cords, concrete reinforcing materials, etc.

Polyketones mainly composed of repeating units comprising ethylene and carbon monoxide have a high melting point of 200° C. or higher, nevertheless, they suffer from the problems that thermal modifications such as three-dimensional crosslinking occur under heating for a long period of time to cause deterioration of molding processability due to loss of flowability, and furthermore mechanical performance and heat resistance performance of the molded products are lowered owing to decrease of the melting point.

As a method for molding a polyketone into fibers or films with high strength, a wet molding method which comprises molding a polyketone dissolved in an aqueous solution of an inorganic salt, such as zinc chloride (e.g. WO99/18143 pamphlet and WO00/09611 pamphlet). However, in this method, there are problems that long-term heating of a dope in which polyketone is dissolved causes thermal modification of the polyketone which results in the deterioration of flowability and spinnability of the dope and that mechanical properties of the resulting fibers or films are thus deteriorated.

If a polyketone is heated, it undergoes chemical reactions, such as Paal-Knorr reaction to produce a furan ring and the formation of intramolecular or intermolecular crosslinking due to aldol condensation, resulting in the progress of heat deterioration of the polyketones. These chemical reactions are considerably accelerated by the polymerization catalyst (palladium (Pd)) remaining in polyketones. As measures against the heat deterioration, techniques of reducing the amount of Pd remaining in polyketones have been proposed (e.g., European Patent No. 285218, U.S. Pat. No. 4,855,400 and U.S. Pat. No. 4,855,401). The reduction of the amount of Pd remaining in polyketones brings about an effect of improving the heat resistance of polyketones. However, the techniques disclosed in the above publications are methods comprising: subjecting a polyketone obtained by a conventional polymerization method to a lengthy Pd extraction treatment using a compound, such as triphenylphosphine, triethylamine or 1,3-bis{di(2-methoxyphenyl)phosphino}propane. Therefore, these methods cannot be put to industrially practical use, taking into consideration the costs for washing facilities, and washing and extracting solvents. Furthermore, since heat deterioration of polyketones also occurs due to the lengthy heat treatment, the heat resistance of the resulting polyketones is not sufficient, although the Pd content is small.

"Polymer", 42 (2001) 6283-6287 discloses that a polyketone obtained by polymerization in acetone solvent is subjected to the extraction treatment with 2,4-pentanedione to reduce the Pd content to 20 ppm or less, whereby the heat resistance of the polyketone can be improved. Regarding this polyketone, the polymerization activity obtained under the above conditions is very low because no alcohol is used as a polymerization solvent. Moreover, since the complicated Pd extraction treatment must be carried out after the polymerization, the method cannot be industrially employed from the viewpoints of productivity and cost.

WO00/09611 pamphlet shows a polyketone having a Pd content of 5 ppm. However, this polyketone is obtained by effecting the polymerization at 80° C. under 5 MPa and then removing Pd in the polymer by solvent extraction. The method thus has problems that the polymerization rate is very low and that lengthy heat treatment is required during the solvent extraction.

In order to reduce the Pd content in polyketone without carrying out the lengthy extraction treatment, it is necessary to produce a large amount of polyketone with a small amount of Pd, namely, to carry out a polymerization for a long time with high polymerization activity. Some techniques are known as polymerization method with high polymerization activity. For example, JP-A-1-201333, JP-A-2-115223, and WO00/68296 pamphlet and WO01/02463 pamphlet disclose polymerization techniques with the very high polymerization activity which exceeds 20 kg/g-Pd/hr. Here, the polymerization activity is an index (unit: kg/g-Pd/hr) which shows an amount of polymer produced per unit of time with the use of a unit amount of a catalyst (Pd in the present invention). The greater its value is, the larger the amount of polyketone obtained from a unit amount of Pd is.

However, all the polyketones obtained by the polymerization methods with high polymerization activity (20 kg/g-Pd·hr or higher) disclosed in the above publications have low polymerization degree and the intrinsic viscosity lower than 2.5 dl/g. The techniques are thus insufficient to be used for fibers or films with high strength.

With reference to the terminal structure of polyketones, studies have been carried out on the relation between the kind of polymerization solvent and the structure and ratio of the terminals produced. It is known that the terminal structure of polyketones varies depending on the kind of solvents used for the polymerization. Chem. Rev., 96 (1996), 663-681 proposes the following mechanisms (reaction formula I to reaction formula VI) in the polymerization reaction of polyketone in methanol, which show that an alkyl ester terminal (reaction formulas I, V) and an alkyl ketone terminal (reaction formulas II, VI) are produced in the initiation reactions and termination reactions. In the following reaction formulae, $L_2$ denotes a phosphorus bidentate ligand and Pol denotes a molecular chain of polyketone polymer.

(Initiation Reaction)

Reaction Formula I:

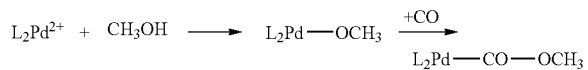

Reaction Formula II:

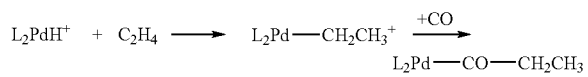

(Growth Reaction)

Reaction Formula III:

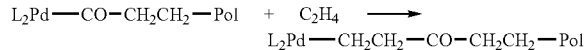

Reaction Formula IV:

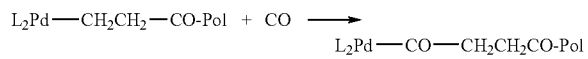

(Termination Reaction)

Reaction Formula V:

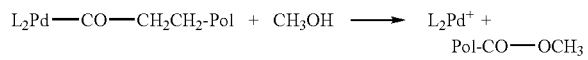

Reaction Formula VI:

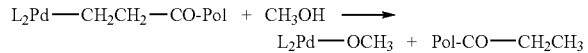

Furthermore, JP-A-59-197427 discloses the terminal structures and ratio thereof in the case of using various polymerization solvents with 1,3-bis(diphenylphosphino)propane as a phosphorus ligand. For example, it is disclosed that when an alcohol, such as methanol or ethanol, is used, an alkyl ester terminal and an alkyl ketone terminal are produced, when a glycol, such as ethylene glycol, is used, a hydroxyalkyl terminal and an alkyl ketone terminal are produced, and when a non-protonic polar solvent, such as tetrahydrofuran or acetone, is used, only an alkyl ketone terminal is produced. The above publication discloses that when an alkyl ester terminal is produced, the equivalent ratio of alkyl ester terminal (terminal group A)/alkyl ketone terminal (terminal group B) is not 1/1, but 0.09/1-1.04/1. However, polyketones illustrated in the above publication are all polymers with low molecular weights and the publication makes no mention of polyketones with high molecular weights having an intrinsic viscosity of 2.5 dl/g or higher. Specifically, the polyketones having terminal group A and terminal group B that are shown in Examples of the publication have a number-average molecular weight of 250-7500. When the intrinsic viscosity is calculated using the formula (Intrinsic viscosity=$1.0 \times 10^{-4} \times Mw^{0.85}$) described in a publication (e.g., JP-A-4-228613) with proviso that the molecular weight distribution (Mw/Mn) is 3.3 which is a value of general polymers, the intrinsic viscosity of the polyketones described in the Examples is 0.03-0.54 dl/g, and hence the polyketones cannot be expected to exhibit high mechanical characteristics of high strength and high elastic modulus.

Moreover, regarding the polyketones disclosed in the publication, the polymerization activity is very low, and the theoretical Pd content in the polyketones, which is calculated from the product of polymerization activity and polymerization time (catalyst efficiency) is 100 ppm or more. Thus, the polyketones contain a considerably large amount of Pd.

Regarding the terminal groups of polyketones, studies are conducted on the polymerization conditions and the structure and ratio of the produced terminals, nevertheless, regarding the relation between the terminal structure and the characteristics of polyketones, it is merely disclosed, for example, in JP-A-2-16155 that the characteristics of polyketones do not depend on the structure of the terminal groups. Particularly, no disclosure is made as to the control of structure of terminal group as a means to improve the heat stability of polyketones in an aqueous solution of a metal salt.

The object to be solved in the present invention is to provide a polyketone that has a high molecular weight, exhibits high mechanical characteristics and excellent heat resistance and chemical resistance when molded into the products, such as fibers and films, and can be used as inexpensive industrial starting materials. Such a polyketone has not been obtained by known techniques. The further object to be solved in the present invention is to provide a method for producing the polyketone in a highly productive manner with high polymerization activity without carrying out complicated steps, such as catalyst extraction treatment.

DISCLOSURE OF INVENTION

In order to attain the above objects, the inventors have conducted an intensive research to improve the heat resistance of polyketones by controlling the conditions for the production of polyketones with high molecular weight and high melting point and controlling the structure of polyketones, and, as a result, it has been found that the above objects can be attained by reducing the content of Pd in polyketones and render the proportion of the terminal structures of polyketones within a specific range. Thus, the present invention has been accomplished.

That is, the present invention relates to the following embodiments.

(i) A polyketone comprising repeating units, 95-100 mol % of which are 1-oxotrimethylene represented by the formula (1) and having an intrinsic viscosity of 2.5-20 dl/g, wherein the content of Pd element is 0-20 ppm and terminal structures include an alkyl ester group (terminal group A) represented by formula (2) and an alkyl ketone group (terminal group B) represented by formula (3) and the equivalent ratio of terminal group A/terminal group B is 0.1-8.0:

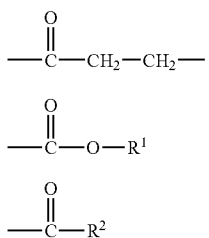

(1)

(2)

(3)

(wherein R¹ represents a hydrocarbon group of 1-6 carbon atoms and R² represents an organic group of 1-10 carbon atoms).

(ii) A polyketone of (i), wherein the intrinsic viscosity is 4.0-8.0 dl/g, the equivalent ratio of terminal group A/terminal group B is 0.5-3.0, and the content of Pd element is 0-10 ppm.

(iii) A polyketone of (i) or (ii), wherein the content of carboxylic acid terminal group is 0-10 milli-equivalent/kg.

(iv) A polyketone of any one of (i)-(iii), which has a DSC melting point $Tm^3$ of 230° C. or higher.

(v) A polyketone of any one of (i)-(iv) which has a DSC melting point $Tm^3$ of 240° C. or higher.

(vi) A polyketone of any one of (i)-(v), wherein the terminal group A is a methyl ester group represented by the formula (4), the terminal group B is an ethyl ketone group represented by the formula (5), and the equivalent ratio of terminal group A/terminal group B is 1.0-8.0:

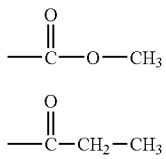

(4)

(5)

(vii) A polyketone of any one of (i)-(v), wherein the terminal group A is an isopropyl ester group represented by the formula (6), the terminal group B is an ethyl ketone group represented by the formula (5), and the equivalent ratio of terminal group A/terminal group B is 0.5-2.5.

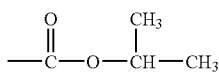

(6)

(viii) A polyketone of any one of (i)-(vii), wherein when the polyketone is dissolved in hexafluoroisopropanol at a concentration of 0.1 wt % and ultraviolet spectrum of the solution is measured in a quarts cell at a scanning speed of 200 nm/min and a data intake interval of 0.5 nm, the minimum value of absorbance observed at a wavelength of 200-250 nm is 0.14 or less.

(ix) A polyketone molded product having repeating units, 95-100 mol % of which are 1-oxotrimethylene represented by the formula (1) and having an intrinsic viscosity of 2.5-20 dl/g, wherein the content of Pd element is 0-20 ppm and terminal structures include an alkyl ester group (terminal group A) represented by the formula (2) and an alkyl ketone group (terminal group B) represented by the formula (3), and the equivalent ratio of terminal group A/terminal group B is 0.1-8.0:

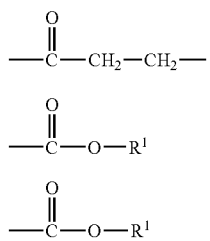

(1)

(2)

(3)

(wherein R¹ is a hydrocarbon group of 1-6 carbon atoms and R² is an organic group of 1-10 carbon atoms).

(x) A polyketone fiber having repeating units, 95-100 mol % of which are 1-oxotrimethylene represented by the formula (1) and having an intrinsic viscosity of 2.5-20 dl/g, wherein the content of Pd element is 0-20 ppm and terminal structures include an alkyl ester group (terminal group A) represented by the formula (2) and an alkyl ketone group (terminal group B) represented by the formula (3), and the equivalent ratio of terminal group A/terminal group B is 0.1-8.0:

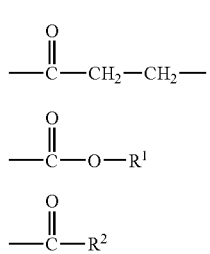

(1)

(2)

(3)

(wherein R¹ is a hydrocarbon group of 1-6 carbon atoms and R² is an organic group of 1-10 carbon atoms).

(xi) A tire cord comprising at least 50 wt % of the polyketone fiber of (x).

(xii) A polyketone article, characterized in that the polyketone molded product of (ix) or the polyketone fiber of (x) is at least partly used in the article.

(xiii) A polyketone article of (xii) which is a tire, a belt or a building material.

(xiv) A fiber-reinforced composite material comprising at least 1 wt % of the polyketone fiber of (x) in the whole fiber.

(xv) A method for producing a polyketone having an intrinsic viscosity of 2.5-20 dl/g by copolymerizing carbon monoxide and an ethylenically unsaturated compound, wherein the copolymerization is carried out in the presence of a metal complex catalyst obtained by reacting the following compounds (a)-(c), in the following liquid medium (d), and under the following conditions (e):

(a) a palladium compound,
(b) a bidentate ligand having an atom of Group 15 elements,
(c) an acid having a pKa of not more than 4,
(d) a liquid medium containing an alcohol of 1-6 carbon atoms and water and having a water content, as represented by the following Expression 1, of 10-500,000 ppm,
(e) a polymerization pressure P of not lower than 5 MPa and a polymerization temperature T of 50-200° C., $$\text{Water content (ppm)} = \frac{\text{Mass of water (g)}}{\text{Volume of polymerization solvent other than water (ml)} + \text{Volume of water (ml)}} \times 10^6$$

1 the volume in the denominator of the right side is a value at 25° C.).

(xvi) A method for producing a polyketone of (xv), wherein the polymerization temperature is 70-200° C. and the polymerization pressure is not lower than 7 MPa.

(xvii) A method for producing a polyketone of (xv) or (xvi), wherein (a) is at least one palladium compound selected from the group consisting of palladium acetate, palladium trifluoroacetate, palladium acetylacetonate and palladium chloride;

(b) is at least one phosphorus bidentate ligand selected from the group consisting of 1,3-bis{di(2-methoxyphenyl)phosphino}propane, 1,3-bis(diphenylphosphino)propane, 1,2-bis[{di(2-methoxyphenyl)phosphino}methyl]benzene, and 1,3-bis{di(2-methoxy-4-sodium sulfonate-phenyl)phosphino}propane;

(c) is at least one acid selected from the group consisting of sulfuric acid, methanesulfonic acid, trifluoromethanesulfonic acid and trifluoroacetic acid; and (d) is a solvent containing at least one alcohol selected from the group consisting of methanol, ethanol, n-propanol and isopropanol.

(xviii) A method for producing a polyketone of any one of (xv)-(xvii), wherein the copolymerization is carried out in the presence of benzoquinone or naphthoquinone.

(xix) A method for producing a polyketone of any one of (xv)-(xiix), wherein the molar ratio of ethylenically unsaturated compound/carbon monoxide in the reaction vessel is 1/1-5/1.

(xx) A method for producing a polyketone of any one of (xv)-(xix), wherein the amount of the palladium compound used is 0.01-10,000 micromoles per 1 liter of the polymerization solvent, and the amount of the bidentate ligand having an atom of Group 15 elements and the amount of the acid having a pKa of not more than 4 based on 1 mole of the palladium compound are 0.1-10 moles and 0.1-10000 moles, respectively.

(xxi) A method for producing a polyketone of any one of (xv)-(xx), wherein the content of the alcohol of 1-6 carbon atoms in the liquid medium (d) is not less than 75 vol %.

(xxii) A method for producing a polyketone of any one of (xv)-(xxi), wherein the acid having a pKa of not more than 4 is sulfuric acid and the polymerization solvent contains an alcohol of 1-6 carbon atoms and water, the water content being 10-500000 ppm.

(xxiii) A method for producing a polyketone of any one of (xv)-(xxii), wherein the polymerization pressure P (MPa) and the polymerization temperature T (° C.) satisfy both of the following expressions 2 and 3:

$$P \geq 720 \times \exp(-0.0629 \times T) \quad \text{Expression 2}$$

$$P \geq 0.0179 \times \exp(0.0607 \times T). \quad \text{Expression 3}$$

(xxiv) A method for producing a polyketone having an intrinsic viscosity of 3.0-20 dl/g by copolymerizing carbon monoxide and an ethylenically unsaturated compound, wherein the polymerization activity is 10 kg/g-Pd·hr or higher.

(xxv) A method for producing a polyketone having an intrinsic viscosity of 2.5-20 dl/g by copolymerizing carbon monoxide and an ethylenically unsaturated compound, wherein the polymerization activity is not lower than 20 kg/g-Pd·hr and the catalyst efficiency (kg/g-Pd) expressed by the product of the polymerization activity and the polymerization time (hr) is not less than 50.

BEST MODE FOR CARRYING OUT THE INVENTION

In the polyketone of the present invention, 95-100 mol % of the repeating units are 1-oxotrimethylene represented by the formula (1). If the proportion of 1-oxotrimethylene is less than 95 mol %, the crystallinity of the polyketone greatly lowers, and it becomes difficult to obtain a polyketone molded product with high strength and high melting point. With the increase of the proportion of 1-oxotrimethylene, the resulting polyketone molded product is superior in the strength, elastic modulus and melting point, and therefore the proportion is preferably 97 mol % or more, most preferably 100 mol %.

The repeating units other than 1-oxotrimethylene are not particularly limited, and are generally those which are formed by bonding of carbon monoxide and ethylenically unsaturated compounds other than ethylene. Examples of the ethylenically unsaturated compounds include α-olefins such as propylene, 1-butene, 1-hexene, 1-octene and 1-decene; alkenyl aromatic compounds such as styrene and α-methylstyrene; cyclic olefins such as cyclopentene and norbornene; halogenated vinyl compounds such as vinyl chloride; acrylic acid ester compounds such as ethyl acrylate and methyl methacrylate; and the like. These repeating units derived from carbon monoxide and ethylenically unsaturated compounds may comprise one unit or a mixture of two or more units.

If the intrinsic viscosity of the polyketone of the present invention is too low, molded products with high mechanical characteristics, such as high strength and high elastic modulus cannot be obtained, and hence it must be 2.5 dl/g or higher. On the other hand, if the intrinsic viscosity is too high, moldability, solubility in solvents and productivity are deteriorated, and hence it must be 20 dl/g or lower. From the viewpoints of the physical properties and the ability to pass the production process of the resulting molded products, the intrinsic viscosity is more preferably 3.0-15 dl/g, further preferably 3.5-10 dl/g, most preferably 4-8 dl/g.

It is necessary that the content of Pd element in the polyketone of the present invention is 20 ppm or less. If the content of Pd element exceeds 20 ppm, thermal modification and chemical reactions caused by the remaining Pd readily take place, resulting in phenomena such as an increase of melt viscosity during melt molding and an increase of viscosity of dopes when the polyketone is dissolved in a solvent, to cause the deterioration of the processability. Furthermore, Pd element also remains in a large amount in the molded product of polyketone, which causes the deterioration of the heat resistance of the molded product. From the viewpoints of the ability to pass through the production process and the heat resistance of the molded product, the content of Pd element in the polyketone is preferably as small as possible, and more preferably 10 ppm or less, further preferably 5 ppm or less, most preferably 0 ppm.

The polyketone of the present invention have two kinds of terminal groups, namely, an alkyl ester group (terminal group A) represented by the formula (2) and an alkyl ketone group (terminal group B) represented by the formula (3).

In the present invention, it is necessary that the carbon number of $R^1$ which constitutes the terminal group A is 1-6. When the carbon number of $R^1$ is 7 or more (namely, when an alcohol having 7 or more carbon atoms is used as a polymerization solvent), there occur the following problems:

(1) polymerization of polyketone with high polymerization activity becomes difficult, and a lengthy reaction is required for producing a polyketone with low Pd content, resulting in the deterioration of productivity;

(2) viscosity of polymerization suspension increases, and uniform stirring becomes difficult;

(3) boiling point of the solvent rises and the recovery cost increases; and the like. From the viewpoints of the polymerization activity and productivity, the carbon number of $R^1$ is more preferably 1-4. As a preferred structure of the terminal group A, mention may be made of methyl ester group having 1 carbon atom (formula (4)) and isopropyl ester group having 4 carbon atoms (formula (6)).

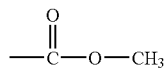

(4)

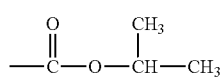

(6)

When the carbon number is within the range of 1-6, the structure of $R^1$ may be of straight chain, may have branches or may be cyclic, and furthermore may include two or more groups differing in the chain length or shape.

In the present invention, it is necessary that $R^2$ which constitutes the terminal group B is an organic group of 1-10 carbon atoms. Examples of the organic groups of 1-10 carbon atoms are hydrocarbon groups such as methyl group, ethyl group, n-propyl group, isopropyl group, n-butyl group, n-pentyl group, n-heptyl group, phenyl group and benzyl group. A part or the whole of these hydrocarbon groups or a part or the whole of hydrogen atoms may be optionally substituted with an ester group, an ether group, a carbonyl group, an amino group, an amide group, a halogen atom, or the like. When the carbon number of the organic groups exceeds 10 the crystallinity of the resulting polyketone lowers and the heat resistance deteriorates. Therefore, the carbon number of $R^2$ is more preferably 2-6, further preferably 2-3, especially preferably 2. A preferred structure of the terminal group B is specifically an ethyl ketone group having 2 carbon atoms (the formula (5)).

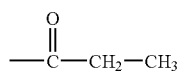

(5)

The polyketone of the present invention may have terminals other than the terminal group A and the terminal group B, such as a carboxylic acid terminal group, an alcohol terminal group and an alkyl ester terminal group of 7 or more carbon atoms, with a proviso that these terminal groups are present at an equivalent ratio of 20% or less in all the terminal groups.

In the case where carboxylic acid terminal groups are contained in a polyketone, if the amount of the carboxylic acid terminal group is large, the heat resistance of the polyketone deteriorates and the heat deterioration is apt to occur during molding or use. Therefore, the amount of the carboxylic acid terminal groups in the polyketone is preferably 10 milli-equivalent/kg or less, more preferably 5 milli-equivalent/kg or less, most preferably 0 milli-equivalent/kg.

In the present invention, it is necessary that the equivalent ratio of terminal group A/terminal group B is 0.1-8.0. When the ratio of terminal group A/terminal group B is 0.1-8.0, the polyketone is excellent in the heat stability in a metal salt solvent, such as aqueous zinc chloride solution, and molded products with stable quality can be obtained.

If the equivalent ratio of terminal group A/terminal group B is less than 0.1, the quality of the polymer is deteriorated during the polymerization or treatments after the polymerization.

On the other hand, the ratio of terminal group A/terminal group B exceeds 8.0, problems such as modification of polymer and deterioration of processability caused by three-dimensional crosslinking due to a lengthy heat treatment or dissolution in solvents occurs conspicuously. From the viewpoints of heat resistance, chemical resistance, productivity and cost, the ratio of terminal group A/terminal group B is preferably 0.2-4.0, more preferably 0.3-3.0, further preferably 0.5-2.5, especially preferably 1.0-2.0.

In this case, the ratio of terminal groups in the polyketone can be obtained from the ratio of area of the peak resulting from the alkyl ester terminal group and area of the peak resulting from the alkyl ketone terminal group which are measured by the known method ($^1$H-NMR method).

The melting point of the polyketone of the present invention is preferably 220° C. or higher, more preferably 240° C. or higher, further preferably 250° C. or higher from the viewpoint of the heat resistance of the resulting molded product.

The polyketone of the present invention is less in Pd content and is excellent in thermal moldability and heat resistance. The heat resistance can be evaluated by DSC melting point $Tm^3$ measured by the method described in the Examples of the present invention. When an operation of heating the polyketone from a room temperature to a temperature higher than the melting point and again cooling to the room temperature is repeated, thermal modification such as formation of furan ring or aldol condensation proceeds during the heating to a temperature higher than the melting point. When the polyketone is cooled to a temperature lower than the melting point the thermally modified portion becomes irregular in structure and cannot be crystallized and accordingly crystallinity of the polyketone is deteriorated. The less the thermal modification, the less the deterioration in crystallinity of the polyketone. As a result, the melting point in the case of re-heating is also kept high. The DSC melting point $Tm^3$ is the melting point of the polyketone after repeating the heating and cooling treatments, and the higher DSC melting point means that the crystallinity of polyketone is satisfactory and the thermal modification hardly occurs. Specific value of the DSC melting point $Tm^3$ is preferably 230° C. or higher. The DSC melting point $Tm^3$ is more preferably 235° C. or higher, further preferably 240° C. or higher.

The polyketone of the present invention undergoes less thermal modification such as chemical crosslinking because it is not exposed to excess heat history such as long-term polymerization or solvent extraction treatment. This polyketone which undergoes less thermal modification has the advantages of excellent processability such as heat moldability or solution moldability, as well as excellent heat resistance characteristics of molded products. As a specific method for measuring the degree of thermal modification of polyketone, there is a method of ultraviolet spectrum measurement of hexafluoroisopropanol solution as described in the Examples given hereinafter. It is preferred that the minimum value of absorbance in the ultraviolet absorption spectrum is 0.14 or less. This minimum value of absorbance corresponds to the degree of crosslinked structure formed by the thermal modification of polyketone, and the smaller the minimum value, the smaller the deterioration of polyketone caused during polymerization, and washing and drying of the polymer. The polyketone having the smaller minimum value has superior processability, and the resulting molded product has superior thermal characteristics. Therefore, the minimum value of absorbance is more preferably 0.13 or less, especially preferably 0.12 or less.

Furthermore, in addition to Pd, phosphorus compounds or acids used as polymerization catalysts also remain as impurities in the polyketone. In case these compounds remain in large amounts, there occur not only the problems of the deterioration and discoloration during storage of polyketone, but also the problems of modification of polyketone during molding, deterioration of heat resistance and discoloration of molded products. Therefore, the amount of phosphorus element in polyketone is preferably 20 ppm or less, more preferably 10 ppm or less, further preferably 5 ppm or less, especially preferably 0 ppm. Moreover, when acids containing sulfur element, such as sulfuric acid, methanesulfonic acid and trifluoromethanesulfonic acid are used for polymerization, the amount of sulfur element remaining in polyketone is preferably 20 ppm or less, more preferably 10 ppm or less, further preferably 5 ppm or less, especially preferably 0 ppm.

The from of polyketone of the present invention after polymerization is not particularly limited, and the polyketone may be in any forms. In the case of producing the polyketone by suspension polymerization, the resulting polyketone is in the form of particles or flakes, and from the viewpoint of solubility in solvent, it is preferably in the form of particles. The size or shape of the particles is not particularly limited, but from the viewpoints of handleability and solubility in solvents, the average particle diameter is preferably 0.01-2 mm, more preferably 0.1-1 mm. The shape of the particles is especially preferably spherical.

Furthermore, from the viewpoints of storage stability and transportability, the higher bulk density of the resulting polyketone is preferred, and from the viewpoint of solubility in solvents, the lower bulk density is preferred. From the viewpoint of the balance between the transportability and the solubility, the bulk density is preferably 5-50 g/100 ml, more preferably 20-45 g/100 ml, especially preferably 30-40 g/100 ml.

If necessary, the polyketone of the present invention may contain various additives, such as heat stabilizer, anti-foaming agent, orthochromatic agent, flame retardant, anti-oxidant, ultraviolet absorber, infrared absorber, crystal nucleating agent, and surface active agent.

Regarding the molded products made from the polyketone of the present invention, it is necessary from the viewpoints of mechanical strength, thermal characteristics and heat resistance that 95-100 mole % of the repeating units are 1-oxotrimethylene, the intrinsic viscosity is 2.5-20 dl/g, the equivalent ratio of terminal group A/terminal group B is 0.1-8.0, and the content of Pd element is not more than 20 ppm.

If the proportion of 1-oxotrimethylene of the polyketone that constitutes the polyketone molded product is less than 95 mole %, the crystallinity is considerably deteriorated, and it is difficult to obtain a polyketone molded product with high strength and high melting point. The higher proportion of 1-oxotrimethylene gives excellent strength, elastic modulus and melting point to the resulting polyketone molded product, and the proportion is preferably 97 mol % or more, especially preferably 100 mol %.

The repeating units other than 1-oxotrimethylene are not particularly limited, and generally they are units comprising carbon monoxide and an ethylenically unsaturated compound other than ethylene which are bonded to each other. Examples of the ethylenically unsaturated compounds include α-olefins such as propylene, 1-butene, 1-hexene, 1-octene and 1-decene; alkenyl aromatic compounds such as styrene and α-methylstyrene; cyclic olefins such as cyclopentene, norbornene, 5-methylnorbornene, tetracyclodecene, tricyclodecene, pentacyclopentadecene and pentacyclohexadecene; halogenated vinyls such as vinyl chloride; acrylic acid esters such as ethyl acrylate and methyl methacrylate; and the like. These repeating units derived from carbon monoxide and ethylenically unsaturated compounds may comprise single unit or a mixture of two or more units.

The intrinsic viscosity of the polyketone molded products is required to be not lower than 2.5 dl/g for obtaining the high mechanical physical properties. If the intrinsic viscosity is too high, the processability and productivity deteriorate to increase the cost, and hence it is needed to be not higher than 20 dl/g. From the viewpoints of the physical properties and the ability to pass the production process and the productivity of the molded products, the intrinsic viscosity is more preferably 3.0-15 dl/g, further preferably 3.5-10 dl/g, especially preferably 4-8 dl/g.

It is necessary that the polyketone molded product of the present invention has a content of Pd element of not more than 20 ppm. If the content of Pd element exceeds 20 ppm, the ability to pass the production process is inferior and the heat resistance of the molded product also lowers. Therefore, the content of Pd element in the polyketone molded product is preferably as low as possible, and is more preferably 10 ppm or lower, further preferably 5 ppm or lower, especially preferably 0 ppm.

Moreover, when the polyketone molded product is molded by dissolving the polyketone in a concentrated aqueous solution of a metal salt, such as zinc chloride, followed by carrying out molding, the metal in the solvent sometimes remains in the molded product. The remaining metal adversely affects the heat resistance or mechanical properties of the polyketone molded product, and the amount of the remaining metal is preferably as small as possible. Specifically, the amounts of, for example, Zn element and Ca element are preferably 50 ppm or less, more preferably 20 ppm or less, and especially preferably 0 ppm.

In the present invention, it is necessary that the equivalent ratio of terminal group A/terminal group B in the polyketone molded product is 0.1-8.0. If the ratio of terminal group A/terminal group B is less than 0.1, problems are apt to occur in the processability and long-term heat stability. If the ratio of terminal group A/terminal group B exceeds 8.0, there are apt to occur problems such as modification of polymer and deterioration of processability during heat treatment or dissolution in a metal salt solvent. From the viewpoints of the heat resistance, chemical resistance, productivity and cost, the ratio of terminal group A/terminal group B is preferably 0.2-3.0, more preferably 0.5-2.5, further preferably 1.0-2.0.

Furthermore, there may be present terminals other than the terminal group A and the terminal group B, such as carboxylic acid terminal group and alcohol terminal group, with a proviso that they are present in an amount of not more than 20 mol % of the total terminal groups. In the case of containing the carboxylic acid terminal group, the heat resistance of the polyketone molded product lowers if the amount of the carboxylic acid terminal group is large. Therefore, the amount of the carboxylic acid terminal group in the polyketone molded product is preferably 10 milli-equivalent/kg or less, more preferably 5 milli-equivalent/kg or less, especially preferably 0 milli-equivalent/kg.

As for the specific mechanical characteristics, in the case of using as fibers, the strength of the fibers is preferably 10 cN/dtex or higher, more preferably 12 cN/dtex or higher, especially preferably 15 cN/dtex or higher, and the initial elastic modulus is preferably 200 cN/dtex or higher, more preferably 300 cN/dtex or higher, especially preferably 350 cN/dtex or higher. As for the specific thermal characteristics, the melting point is preferably 240° C. or higher, more preferably 250° C. or higher, especially preferably 260° C. or higher. In the case where the catalyst residues such as Pd and P are present in large amounts, the fibers are gradually deteriorated during the long-term use, nevertheless, it becomes possible by using the polyketone molded product of the present invention to maintain the excellent thermal characteristics and mechanical characteristics for a long time without damaging durability.

Next, the method for producing the polyketone of the present invention will be explained below.

The polyketone of the present invention can be produced by copolymerizing carbon monoxide and an ethylenically unsaturated compound under the following conditions (e) in the following liquid medium (d) in the presence of a metal complex catalyst obtained by reacting the following compounds (a)-(c):

(a) a palladium compound,
(b) a bidentate ligand having an atom of Group 15 elements,
(c) an acid having a pKa of not more than 4,
(d) a liquid medium containing an alcohol of 1-6 carbon atoms and water and having a water content, as represented by the following Expression 1, of 10-500,000 ppm.

Expression 1:

$$\text{Water content } (ppm) = \frac{\text{Mass of water } (g)}{\text{Volume of polymerization solvent other than water (ml)} + \text{Volume of water (ml)}} \times 10^6$$

(e) a polymerization pressure P of not lower than 5 MPa and a polymerization temperature T of 50-200° C.

The catalyst used for the polymerization in the present invention is a metal complex obtained by blending a palladium compound, a bidentate ligand having an atom of Group 15 elements and an acid having a pKa of not more than 4.

Examples of the palladium compound (a) include carboxylates, phosphates, carbamates, sulfonates and halides of palladium, and specific examples include palladium acetate, palladium trifluoroacetate, palladium acetylacetonate, palladium chloride, bis(N,N-diethyl carbamate), bis(diethylamino)palladium, and palladium sulfate. These may be used each alone or in admixture of several kinds. From the viewpoints of the polymerization activity, stability of the metal complex and recovery cost, preferred compounds are palladium acetate, palladium trifluoroacetate, palladium acetylacetonate and palladium chloride, and palladium acetate is especially preferred.

The ligand used for the metal complexes is bidentate ligand (b) having an atom of Group 15, and as examples thereof, mention may be made of nitrogen bidentate ligands, such as 2,2'-dipyridyl, 4,4'-dimethyl-2,2'-dipyridyl, 2,2'-di-4-picoline and 2,2'-diquinoline; phosphorus bidentate ligands, such as 1,2-bis(diphenylphosphino)ethane, 1,3-bis(diphenylphosphino)propane, 1,4-bis(diphenylphosphino)butane, 1,3-bis{di(2-methyl)phosphino}propane, 1,3-bis{di(2-isopropyl)phosphino}propane, 1,3-bis{di(2-methoxyphenyl)phosphino}propane, 1,3-bis{di(2-methoxy-4-sodium sulfonate-phenyl)phosphino}propane, 1,2-bis(diphenylphosphino)cyclohexane, 1,2-bis(diphenylphosphino)benzene, 1,2-bis{(diphenylphosphino)methyl}benzene, 1,2-bis[{di(2-methoxyphenyl)phosphino}methyl]benzene, 1,2-bis[{di(2-methoxy-4-sodium sulfonate-phenyl)phosphino}methyl]benzene, 1,1'-bis(diphenylphosphino)ferrocene, 2-hydroxy-1,3-bis{di(2-methoxyphenyl)phosphino}propane, and 2,2-dimethyl-1,3-bis{di(2-methoxyphenyl)phosphino}propane, and the like.

Among them, more preferred are phosphorus bidentate ligands. From the viewpoints of obtaining polyketones with high polymerization activity and high molecular weight, preferred phosphorus bidentate ligands are 1,3-bis{di(2-methoxyphenyl)phosphino}propane, 1,3-bis(diphenylphosphino)propane, 1,2-bis[{di(2-methoxyphenyl)phosphino}methyl]benzene, and 1,3-bis{di(2-methoxy-4-sodium sulfonate-phenyl)phosphino}propane, and from the viewpoint of producing polyketones with high molecular weight in industrial scale, 1,3-bis(diphenylphosphino)propane and 1,3-bis{di(2-methoxyphenyl)phosphino}propane are especially preferred.

The acids (c) having a pKa of 4 or less include, for example, organic acids, such as trifluoroacetic acid, methanesulfonic acid, trifluoromethanesulfonic acid, and p-toluenesulfonic acid; inorganic acids, such as perchloric acid, sulfuric acid, nitric acid, phosphoric acid, heteropoly-acid, tetrafluoroboric acid, hexafluorophopshoric acid and fluorosilicic acid; boron compounds, such as trispentafluorophenylborane, trisphenylcarbeniumtetrakis pentafluorophenyl)borate and N,N-dimethylaniliumtetrakis(pentafluorophenyl) borate; and the like. These acids can be used each alone or in admixture of two or more.

From the viewpoint that polyketones with high molecular weight can be obtained with high polymerization activity, preferable acids are sulfuric acid, methanesulfonic acid, trifluoromethanesulfonic acid and trifluoroacetic acid. The pKa is a value defined as $pKa=-\log_{10} Ka$ when a dissociation constant of the acid is indicated by Ka, and the smaller the pKa value, the stronger the acids.

Regarding the amount of the palladium compound (a), the suitable amount varies depending on the kind of the ethylenically unsaturated compound selected and other polymerization conditions, and hence the range cannot unconditionally be determined. However, the amount is preferably 0.01-10,000 micromoles, more preferably 0.1-1,000 micromoles per 1 liter of the liquid medium used for polymerization.

The amount of the bidentate ligand (b) is not limited, and is preferably 0.1-10 moles, more preferably 1-3 moles, especially preferably 1.1-1.3 mole per 1 mole of the palladium compound.

The amount of the acid having a pKa of not more than 4 is preferably 0.1-10000 moles, more preferably 1-1000 moles, especially preferably 2-100 moles per 1 mol of palladium.

The metal complex used for the catalyst in the present invention is produced by contacting the palladium compound, the bidentate ligand having an atom of Group 15 elements and the acid having a pKa of not more than 4. Any method can be employed for contacting them. For example, the three components may be used as a solution prepared by previously mixing them in a suitable solvent or the three components may be separately supplied to the polymerization system and contacted in the polymerization system. Alternatively, a complex obtained by previously reacting the palladium compound with the bidentate ligand having an atom of Group 15 elements may be allowed to contact with the acid having a pKa of not more than 4.

The form of the metal complex and procedure of preparation of the metal complex are not particularly limited, but preferably a metal complex comprising a mixture of (a)-(c) is previously prepared and is added into a reaction vessel. In this case, it is preferred that first the palladium compound (a) and the bidentate ligand (b) are mixed, and then the acid (c) is mixed therewith. Solvents used for the preparation of the metal complex may be alcohols, such as methanol, or non-protonic organic solvents, such as acetone and methyl ethyl ketone.

The polymerization of polyketone is carried out by contacting carbon monoxide and the ethylenically unsaturated compound with the metal complex through a liquid medium. From the viewpoint of producing polyketone with a high polymerization activity, the liquid medium (hereinafter sometimes referred to as "polymerization solvent") is required to be a liquid medium containing an alcohol of 1-6 carbon atoms and water and having a water content represented by the Expression 1 of 10-500,000 ppm. In Expression 1, the volumes of the liquid media in the denominator of the right side are values at 25° C.

When the polymerization is carried out in a polymerization solvent containing no hydroxyl group, such as acetone, tetrahydrofuran and dimethyl sulfoxide, the polymerization rate is very low and the polyketone of the present invention which is small in Pd content cannot be obtained. Furthermore, when the polymerization is carried out in a polymerization solvent containing only the alcohol of 7 or more carbon atoms, the polymerization rate is also very low and the polyketone with a small Pd content cannot be obtained, either. In the case of using these polymerization solvents, the equivalent ratio of terminal group A/terminal group B of the resultant polyketone is less than 0.1, and under these conditions, it is difficult to produce polyketone with a high polymerization activity, and the quality of the resulting polyketone is deteriorated.

The carbon number of the alcohol contained in the polymerization solvent must be 6 or less, and is preferably 4 or less from the viewpoint of obtaining a higher polymerization activity. Specific compounds include methanol, ethanol, butanol, n-propanol, isopropanol, etc. From the viewpoints of the handleability, polymerization activity and increase in molecular weight, methanol and isopropanol are particularly preferred. These alcohols may be used each alone or in admixture.

The content of the alcohol of 1-6 carbon atoms in the polymerization solvent is not particularly limited, but is preferably 20 vol % or more from the viewpoint of producing the polyketone with high polymerization activity. With the increase of the content of the alcohol, the polymerization activity becomes higher, and hence the amount of the alcohol of 1-6 carbon atoms in the polymerization solvent is preferably 50 vol % or more, more preferably 75 vol % or more.

Furthermore, in order to obtain the polyketone of the present invention which is low in the Pd content, it is necessary that the water content represented by the Expression 1 in the polymerization solvent is 10-500,000 ppm. In the present invention, when the catalyst is dissolved in a liquid medium and the resulting catalyst solution is added to the polymerization solvent, the catalyst solution is also regarded to be a part of the polymerization solvent, and the volume of the catalyst solution is added to the denominator of the right side of Expression 1, and when water is used for the catalyst solution, this is added to the numerator of the right side of the Expression 1, and thus the water content is obtained.

If the water content in the polymerization solvent is less than 10 ppm, the polymerization activity cannot be sufficiently enhanced even when an alcohol of 1-6 carbon atoms is used for the polymerization solvent. On the other hand, when the water content in the polymerization solvent is 10 ppm or more, the effect of enhancing the polymerization activity is exhibited. If the water content is more than 500,000 ppm, however, the molecular weight does not increase, though the polymerization activity increases. As a result, it becomes difficult to produce a polyketone having an intrinsic viscosity of not lower than 2.5 dl/g. The preferred water content is 500-200,000 ppm. Moreover, when water is present in an amount of 100-10,000,000 fold moles with respect to the palladium compound and in an amount of 1-50,000 fold moles with respect to the acid having a pKa of not more than 4, the polymerization activity is further improved, which is preferred.

Furthermore, in the polymerization solvent, an organic solvent, e.g., a ketone such as acetone or methyl ethyl ketone, an ether such as diethyl ether or tetrahydrofuran, or the like may be used together.

A metal complex is added to the above polymerization solvent as a catalyst to carry out the polymerization of polyketone in a reaction vessel, such as an autoclave, in the presence of an ethylenically unsaturated compound and carbon monoxide under the conditions of a polymerization pressure P of 5 MPa or higher and a polymerization temperature T of 50-200° C.

If the polymerization pressure P is lower than 5 MPa, it is difficult to carry out the polymerization with high polymerization activity, and the polyketone of the present invention low in Pd content cannot be produced. Therefore, the polymerization pressure P is required to be 5 MPa or higher. As the polymerization pressure becomes higher, the polymerization activity also becomes higher to lessen the Pd content in the polyketone and improve the productivity. Therefore, the polymerization pressure is preferably 7 MPa or higher, more preferably 10 MPa or higher, further preferably 15 MPa or higher.

On the other hand, when the polymerization pressure is too high, equipments, such as reaction vessel and piping, are become heavy, which leads to the increase of costs for producing the equipments. Therefore, the pressure at the time of polymerization is desirably 300 MPa or lower, more preferably 100 MPa or lower and further preferably 30 MPa or lower.

It is necessary that the polymerization temperature T is 50° C. or higher. If the polymerization temperature is lower than 50° C., the polyketone can hardly be produced with high polymerization activity even if the polymerization pressure is raised. As the polymerization temperature becomes higher, the polymerization activity also becomes higher to lessen the Pd content in the polyketone decreases and productivity is improved. Therefore, the polymerization temperature is preferably 70° C. or higher, more preferably 80° C. or higher.

On the other hand, when the polymerization temperature is too high, the polymerization termination reaction rate becomes too high, and it becomes difficult to produce a polyketone with high molecular weight which has an intrinsic viscosity of not lower than 2.5 dl/g. Therefore, the polymerization temperature is required to be 200° C. or lower, preferably 120° C. or lower, more preferably 100° C. or lower.

From the viewpoint of obtaining a polyketone with high molecular weight with high polymerization activity, the polymerization pressure P and the polymerization temperature T are preferably within the ranges of Expressions 2 and 3.

Expression 2 shows a preferable pressure range for obtaining a polymerization activity of 10 kg/g-Pd·hr or higher at temperature T, and Expression 3 shows a preferable pressure range for obtaining an intrinsic viscosity of 2.5 dl/g or higher at temperature T.

From the viewpoints of carrying out the polymerization for a long time with maintaining high polymerization activity, it is preferred to add, as additives, quinones such as benzoquinone, naphthoquinone and anthraquinone, metal salt compounds such as copper chloride, aluminum chloride and iron chloride, and the like. Benzoquinone and naphthoquinone have high effect of maintaining the polymerization activity and hence are preferred. The amount of the additives is preferably 10-10,000 moles, more preferably 50-500 moles per 1 mole of the palladium compound (a). The quinones may be added by any of the method of adding them to a catalyst composition and charging them in the reaction vessel and the method of adding them to the polymerization solvent, and if necessary, they may be continuously charged in the reaction vessel during the reaction.

The above-mentioned catalyst composition and optional additives are added to the above polymerization solvent and the polymerization is carried out in a reaction vessel such as autoclave in the presence of the ethylenically unsaturated compound and carbon monoxide under the following conditions.

The proportion of carbon monoxide and the ethylenically unsaturated compound is preferably 2/1-1/15, more preferably 1/1-1/10 in molar ratio of carbon monoxide/ethylenically unsaturated compound, from the viewpoints of polymerization activity and recovery cost, and is preferably 1/2-1/5, from the viewpoint that the polymerization activity can be increased. The method for addition of carbon monoxide and ethylenically unsaturated compound is not particularly limited, and they may be previously mixed and then added, or they may be added from separate feeding lines, respectively.

In the case of producing the polyketone by a suspension polymerization method, the volume ratio of gas phase/liquid phase is preferably 1/50-1/1 from the viewpoint of producing the polyketone in a larger amount per capacity of the reaction vessel, and is preferably 1/10-5/1 from the viewpoints of dissolution rate of carbon monoxide and ethylene in the liquid phase and control of the reaction. From the viewpoints of polymerization activity, productivity, controllability of reaction and cost, the volume ratio of gas phase/liquid phase is more preferably 1/30-1/1.

The polymerization time for the polyketone is preferably 1-24 hours. If the polymerization time is less than 1 hour, the Pd content in the polyketone is high, and a particular step for removing the catalyst is required, resulting in the deterioration of productivity. On the other hand, if the polymerization time exceeds 24 hours, yield of polyketone per a given time decreases and productivity is deteriorated. The polymerization time is more preferably 1.5-10 hours, especially preferably 2-6 hours.

The polymerization time in the present invention means the time from the point of time when carbon monoxide and the ethylenically unsaturated compound are introduced into a reaction vessel which contains the above catalyst composition and polymerization solvent and is under the above-mentioned polymerization conditions till the point of time when the atmosphere in the reaction vessel is converted to a state where substantially no reaction takes place, for example, by lowering the temperature or releasing the internal pressure. In the case of the continuous polymerization method according to which carbon monoxide and ethylenically unsaturated compound are continuously introduced into the reaction vessel and the polymerization products are continuously discharged, an average residence time from the introduction to the discharging is taken as the polymerization time.

As to the method for producing polyketone according to the present invention, it is preferred that the polymerization activity is high, from the viewpoint of obtaining a polyketone with a content of Pd element of 20 ppm or less at an industrial cost. The polymerization activity in the present invention is a numerical value calculated in accordance with the following Expression 4, and the greater value means that the amount of polyketone obtained per unit of Pd amount and unit of polymerization time is greater, in other words, that the amount of Pd required for obtaining the same amount of polyketone is smaller and the time required for polymerization is shorter.

$$\text{Polymerization activity}(kg/g-Pd/hr) = \frac{\text{Yield of polyketone (Kg)}}{\text{Amount of Pd used for catalyst }(g) \times \text{polymerization time }(hr)} \quad \text{Expression 4}$$

Even when the polymerization activity is low, the amount of Pd element in the polyketone can be reduced by prolonging the polymerization time, but when the polymerization time is prolonged, there occur such problems that a large amount of an oxidizing agent is required for inhibiting deactivation of the catalyst and productivity lowers.

The polymerization activity is preferably 10 kg/g-Pd·hr or higher. From the viewpoints of productivity and cost of Pd used for the resulting starting materials, the polymerization activity is more preferably 20 kg/g-Pd·hr or higher, further preferably 30 kg/g-Pd·hr or higher, especially preferably 40 kg/g-Pd·hr or higher.

In order to reduce the amount of Pd element in the polyketone to not more than 20 ppm without employing the steps such as washing and removal of catalyst, it is preferred to produce a polyketone containing not more than 20 ppm of Pd element only by the polymerization step, and in this case, the catalyst efficiency (kg/g-Pd) expressed by the product of the polymerization activity (kg/g-Pd·hr) and the polymerization time (hr) is preferably 50 (kg/g-Pd) or higher. The higher the catalyst efficiency, the smaller the amount of Pd element in the polyketone. Hence the catalyst efficiency is more preferably 100 or higher, further preferably 200 or higher.

The polymerization method of polyketone is not particularly limited, and known polymerization methods and production processes can be used. For example, the polymerization methods include a suspension polymerization method using a liquid medium, a gas phase polymerization method in which a small amount of polymer is impregnated with a high concentration catalyst solution, and the like. The process may be either of a batch type process or a continuation type process.

A preferred embodiment of polymerization process will be described in reference to an example of the suspension polymerization method of polyketone comprising carbon monoxide and ethylene.

Carbon monoxide and ethylene used for the reaction are passed through an absorption column of at least one stage to remove impurities, such as sulfur content, iron content, metal carbonyl, methane and ethane, to perform purification. The purified carbon monoxide and ethylene are separately or in admixture pressurized to a pressure higher than the reaction pressure by a gas compressor and/or a liquid compressor, and, if necessary, subjected to reduction in pressure, and thereafter introduced into a reaction vessel at a given molar ratio.

Carbon monoxide and the ethylenically unsaturated compound may be introduced into either of the gas phase part and the liquid phase part in the reaction vessel. When they are introduced into the gas phase part, it is preferred to promote the dissolution of them in the polymerization solvent by stirring the gas-liquid interface. The proportion of gas-liquid interface area S ($cm^2$)/liquid phase part volume V ($cm^3$) is preferably 0.1 or higher, more preferably 0.3 or higher. When they are introduced into the liquid phase part, it is preferred to promote the dissolution in the polymerization solvent by stirring the portion around the introduction position.

The reaction vessel may be any of autoclave type and tubular type. When a reaction vessel of autoclave type is used, a plurality of the reaction vessels may be connected in series, and the polymerization may be effected in multistage of two or more stages. The inner wall of the reaction vessel is preferably subjected to surface treatments, such as glass lining or Teflon lining.

The catalyst composition is previously prepared in a catalyst preparation apparatus and continuously fed to the reaction vessel at the starting of the polymerization or during the polymerization.

The catalyst composition, carbon monoxide and ethylene are fed to the polymerization solvent, and polymerization is carried out under given conditions of temperature and pressure for a given time.

The bulk density of polyketone is preferably in the range of 5-50 g/100 ml, and the bulk density can be adjusted. In order to increase the bulk density, an acid such as sulfuric acid, trifluoroacetic acid or acetic acid may be added to the polymerization solvent, or a ketone such as acetone or methyl ethyl ketone may be mixed with the polymerization solvent. When an acid is added, it is desirable to add the acid in an amount of 40-5,000 fold moles, preferably 60-1,000 fold moles with respect to the palladium compound. When a ketone is mixed, desirably it is mixed in an amount of 10-80 vol %, preferably 20-60 vol % of the polymerization solvent. On the other hand, in order to decrease the bulk density, there is, for example, a method of adding an alcohol of 3 or more carbon atoms, such as isopropanol, t-butanol, 1-hexanol, 1-octanol or the like to the polymerization solvent. When an alcohol of 3 or more carbon atoms is added, it is desirable to add the alcohol in an amount of 10-80 vol %, preferably 20-60 vol % of the polymerization solvent.

The polyketone after the completion of the polymerization is discharged from the reaction vessel in the state of a suspension. If necessary, the suspension discharged from the reaction vessel is passed through a flush tank to remove unreacted carbon monoxide and ethylene remaining in the suspension.

The gas phase component discharged from the reaction vessel and the flush tank is cooled to remove the polymerization solvent to purify it into unreacted carbon monoxide and ethylene, which are then returned to the compressor and can be reused for the polymerization.

Then, the polyketone suspension is subjected to two stage step, namely, a step of separating a wet polyketone powder and a liquid component, and a step of drying and removing the liquid component remaining in the wet polyketone powder, to isolate polyketone.

For separating the polyketone suspension into the wet polyketone powder and the liquid component, it is preferred to use centrifugal classifying machines such as liquid cyclone, centrifugal settling machine, centrifugal tilting machine and centrifugal hydro-extractor. From the viewpoints of reducing the amount of the catalyst composition remaining in the polyketone and diminishing the drying energy, it is preferred to carry out the separation until the amount of the liquid component in the wet polyketone powder reaches preferably 15-50 wt %, more preferably 18-30 wt % based on the weight of the polyketone. Furthermore, when the operation of washing the wet polyketone powder obtained by the centrifugal separation with the same solvent as used for the polymerization solvent to dilute the catalyst composition remaining in the liquid component in the wet powder and then again carrying out the centrifugal classification are repeated twice or more, the amount of the catalyst composition remaining in the polyketone can be easily reduced. In the case of using sulfuric acid as an acid, it is preferred to wash with a solvent containing water for efficient removal of the remaining sulfuric acid, and it is more preferred to further wash with a solvent containing water heated to 30° C. or higher.

The polymerization solvent remaining in the thus-obtained wet polyketone powder containing 15-50 wt % of the liquid component is dried and removed by heating to a temperature higher than the boiling point of the polymerization solvent. As the drying method, there may be used known apparatuses and methods, such as a method of spraying a heated gas and a method of passing a heated gas with stirring the polyketone powder. A fluidized bed type dryer is preferred from the viewpoints of drying speed and uniformity of drying. The heating temperature is preferably 60-150° C., more preferably 70-120° C. from the viewpoints of drying efficiency and thermal deterioration of polyketone. The heated gas that is passed through the dryer is preferably nitrogen.

The liquid component removed from the polyketone suspension and the liquid component used for the washing are passed through a distiller to remove low boiling point fractions (oligomers, catalyst composition, quinones, etc.), and, if necessary, they are further passed through a fractionator to recover each polymerization solvent component. The recovered solvents are passed through an absorption column, if necessary, and they can be then reused as a solvent for preparation of catalyst, a polymerization solvent and a solvent for washing.

When quinones are used for polymerization, the quinones which have acted as an oxidizing agent of Pd is per se reduced to hydroxyquinones. Since the hydroxyquinones are catalyst poison, they are preferably removed at the time of recovery. In the case where a single distillation treatment is used alone, the hydroxyquinone sublimes and sometimes remains in the recovered solvent. Hence, it is desirable to add an alkali compound such as sodium hydroxide or calcium hydroxide before distillation to settle the hydroxyquinones.

The low boiling point fractions are fired and the palladium compound is regenerated and reused as a catalyst. The method for regeneration of the palladium compound includes, for example, a method of heat treating the low boiling point fractions at 300-1000° C., preferably 350-700° C. in the presence of an inert gas, such as nitrogen, followed by carrying out a firing treatment at 300-1000° C., preferably 350-700° C. in an atmosphere containing 10 vol % or more of oxygen, and then treating the resulting firing product with an acidic solution such as acetic acid or nitric acid. The method for regenerating palladium acetate from the firing product includes, for example, a method of reducing palladium by adding a reducing compound, such as hydrogen, to acetic acid and then adding concentrated nitric acid to oxidize palladium to obtain palladium acetate with high purity.

The polyketone obtained by the above production methods and processes can be made to moldings by melt molding or dry molding or wet molding after being dissolved in a solvent.

For example, in the case of melt molding, polyketone is molten by heating to a temperature from the melting point to the melting point+50° C. and the melt can be molded by a known molding machine. The molding method can be optionally selected depending on the purpose and use, and there may be selected compression molding, extrusion molding, blow molding, mold molding, etc.

Furthermore, it is also possible to add 0.1-80 wt % of water to polyketone to plasticize it to carry out the molding at a temperature of the melting point of the polyketone −10° C., or lower.

The solvent in the case of molding the polyketone dissolved in a solvent is not particularly limited, and there may be used known solvents, for example, organic solvents, such as hexafluoroisopropanol, m-cresol and resorcinol; and metal salt solutions, such as zinc chloride solution and zinc chloride/calcium chloride solution.

After the polyketone is dissolved in the above solvent to prepare a dope, the dope is heated or immersed in a coagulant to extract and remove the solvent from the dope and is molded into desired shapes. In the case where an aqueous solution mainly composed of a halogenated alkali metal salt or halogenated alkaline earth metal, such as zinc chloride, lithium chloride or calcium chloride is used as the solvent, there may occur the deterioration of moldability caused by modification of polyketone or discoloration of the moldings depending on the dissolution conditions or storage conditions. From the viewpoint of inhibiting the thermal modification of polyketone, the time during which the dope is heated to 80° C. or higher is preferably 5 hours or shorter, and, furthermore, if the time from the preparation of the dope until the molding is long, it is desirable to cool the dope to 70° C. or lower after the preparation and heat it just before the molding.

The coagulant is preferably a liquid medium in which polyketone is insoluble, and is preferably an aqueous solution containing 80 wt % or more of water from the viewpoints of safety and cost. In the case of using a metal salt solution containing zinc chloride as a solvent, it is desirable to further wash the polyketone with an acidic solution, such as hydrochloric acid, after the coagulation until the amount of remaining zinc reaches 20 ppm or less, from the viewpoint of the heat resistance of the polyketone molded product.

The polyketone made to an desired shape in the coagulant is successively heated or kept in an atmosphere of reduced pressure to extract and remove the coagulant, whereby a polyketone molded product can be obtained. The heating temperature for removing the coagulant by heating is preferably between the boiling point of the coagulant and the melting point of the polyketone.

Furthermore, if necessary, the polyketone molded product may be successively heated and stretched, to process it into a molded product high in the crystallinity and excellent in the mechanical properties, such as strength and elastic modulus. The heating and stretching conditions can be optionally selected depending on the purpose and use. For the application of industrial fibers, the temperature is suitably 200-270° C. and the stretching ratio is suitably 5-20 times. Especially preferred is a multi-stage stretching in which the stretching in multi-stages of 2 or more stages are carried out, while the stretching temperature is gradually increased.

When the molded product is a polyketone fiber, which is processed to cords and used as a reinforcing material, the number of twist is selected depending on the use. In general, twisting is carried out at a twisting coefficient K in the range of 1000-30000.

In the case where the polyketone is processed to rubber reinforcing fibers, the twisted polyketone cords are as they are or woven in the form of a screen, and then a resorcinol-formalin-latex (RFL) solution is applied thereto, and the resin is fixed thereon. The composition of the RFL solution comprises desirably 0.1-10 wt % of resorcinol, 0.1-10 wt % of formalin and 1-28 wt % of latex. The drying temperature for RFL solution is preferably 100-250° C., more preferably 140-200° C., and the drying by heat treatment is carried out for at least 10 seconds, preferably 20-120 seconds. The cords after drying is successively heat treated. Preferably, the temperature, tension and time for the heat treatment are 150-250° C., 0.01-0.7 cN/dtex, and 10-300 seconds, respectively.

The present invention will be explained specifically by the following Examples, etc. which should not be construed as limiting the invention in any manner.

The organic solvents used in the Examples are completely dried solvents obtained by dehydration of solvents for organic synthesis and additional dehydration with magnesium sulfate under dry nitrogen stream before polymerization. Distilled water containing no impurities, such as metals, was used as water. Sulfuric acid used as the acid was 96 wt % sulfuric acid of special grade chemical. This sulfuric acid contained 4 wt % of water, which is taken into consideration when the amounts of sulfuric acid and water contents in the Examples in the polymerization are obtained.

The methods for measurement of the values used in the Examples are as follows.

(1) Intrinsic viscosity ([η])

The intrinsic viscosity [η] was obtained in accordance with the following Expression 5.

Expression 5:

$$[\eta] = \lim_{c \to o}(T-t)/t \cdot C$$

$$(dl/g)$$

In the Expression 5, t and T indicate falling times of hexafluoroisopropanol having a purity of 98% or higher and a dilute solution of polyketone in hexafluoroisopropanol through a viscosity tube at 25° C., and C indicates a mass value in gram unit of the solute in 100 ml of the above solution.

(2) Polymerization activity:

This shows yield of polyketone per unit amount of palladium and unit time, and was calculated in accordance with Expression 7.

(3) Contents of elements in polyketone:

The contents of Pd, P, Zn and Ca elements were measured according to a known method by high-frequency plasma emission spectrochemical analysis.

(4) Ratio of terminal groups:

12 milligrams of polyketone was dissolved in a mixed solution of 0.05 ml of heavy hydrogen-containing chloroform and 0.6 ml of deuterated hexafluoroisopropanol which contained 0.03 wt % of tetramethylsilane, and measurement of $^1$H-NMR was conducted using FT-NMR manufactured by Bruker Co., Ltd. (trade name: DPX-400). The ratio of terminal groups was obtained by the following method taking the peak of tetramethylsilane as the standard peak (0 ppm).

4-1) In the case of using methanol as polymerization solvent:

Area of a peak observed at around 3.7 ppm (a peak corresponding to ~COOC$\underline{H}_3$) is shown by M and area of a peak observed at around 1.1 ppm (a peak corresponding to ~CH$_2$C$\underline{H}_3$) is shown by K, and M/K is taken as the ratio of terminal groups.

4-2) In the case of using ethanol as polymerization solvent:

Area of a peak observed at around 1.3 ppm (a peak corresponding to ~COOCH$_2$C$\underline{H}_3$) is shown by E and area of a peak observed at around 1.1 ppm (a peak corresponding to ~CH$_2$C$\underline{H}_3$) is shown by K, and E/K is taken as the ratio of terminal groups.

4-3) In the case of using isopropanol as polymerization solvent:

Area of a peak observed at around 1.2 ppm (a peak corresponding to ~COOCH(C$\underline{H}_3$)$_2$) is shown by P and area of a peak observed at around 1.1 ppm (a peak corresponding to ~CH2CH3) is shown by K, and (P/K)/2 is taken as the ratio of terminal groups.

(5) Dry heat resistance Tm$^3$:

5 milligrams of a sample was enclosed in an aluminum pan under a nitrogen atmosphere, and measurement was conducted using a differential thermal measurement device Pyris1 (trade name) manufactured by Perkin-Elmer Co., Ltd. under the following conditions.

Weight of sample: 1 mg

Atmosphere: Nitrogen, flow rate=200 ml/min

Temperature conditions:

(1) Keeping at 20° C. for 1 minute.
(2) 20° C.→280° C. (Heating rate=20° C./min)
(3) 280° C.→20° C. (Cooling rate=20° C./min)
(4) 20° C.→280° C. (Heating rate=20° C./min)
(5) Keeping at 280° C. for 10 minute.
(6) 280° C.→20° C. (Cooling rate=20° C./min)
(7) 20° C.→280° C. (Heating rate=20° C./min)

The peak top temperature Tm$^3$ of maximum endothermic peak observed in the final heating process (7) was measured.

Tm$^3 \geqq 240°$ C.: Dry heat resistance—very good: ◉

$230 \leqq$Tm$^3 < 240°$ C.: Dry heat resistance—good: ○

$220 \leqq$Tm$^3 < 230°$ C.: Dry heat resistance—medium: Δ

Tm$^3 < 220°$ C.: Dry heat resistance—extremely bad: X (6) Solvent heat resistance:

Polyketone was added to an aqueous zinc chloride solution comprising 65 g of zinc chloride and 35 g of water, followed by stirring at 80° C. for 2 hours to prepare a dope. The concentration of polyketone dissolved in the aqueous zinc chloride solution was changed depending on the intrinsic viscosity of polyketone so that the viscosity of the dope reached 300-500 Pa·s.

Furthermore, this dope was kept at SOC for 24 hours, and the solution viscosity at 80° C. of the dope before and after the keeping for 24 hours was measured using BEH type viscometer (trade name) manufactured by Tokyo Keiki Co., Ltd. When the solution viscosity just after the preparation of the dope is shown by $\eta_0$ and the solution viscosity after keeping for 24 hours is shown by $\eta_{24}$, the solution viscosity increasing rate obtained by the following formula is taken as an indication of heat resistance in the solvent.

Solution viscosity increasing rate=
[($\eta_{24}-\eta_0$)/$\eta_0$]×100(%)

The lower solution viscosity increasing rate means that modification in a metal salt solvent is less and solvent stability is higher.

Solution viscosity increasing rate$\leqq$30%: solvent heat resistance is very good: ◉

30<solution viscosity increasing rate$\leqq$50%: solvent heat resistance is good: ○

50<solution viscosity increasing rate$\leqq$100%: solvent heat resistance is bad: Δ

Solution viscosity increasing rate>100%: solvent heat resistance is extremely bad: X (7) Melting point:

The peak top temperature of the maximum endothermic peak in 100° C.→280° C. observed at the first heating process (2) in the heat resistance test of the above (5) is taken as the melting point.

(8) Measurement of ultraviolet spectrum:

100 milligrams of polyketone was dissolved in 100 g of hexafluoroisopropanol (manufactured by Central Glass Co., Ltd.) and this was put in a quarts glass cell, followed by measuring the ultraviolet spectrum using an ultraviolet visible spectrophotometer V-530 (manufactured by Nihon Bunko Co., Ltd.). The measuring conditions are as follows: scanning speed=200 nm/min, data intake interval 0.5 nm, band width=2.0 nm, response=Quick, measurement range=200-600 nm, and base line=corrected.

In the above measurement, the minimum value of absorbance observed at 200-250 nm is referred to as UV$_{min}$. The smaller UV$_{min}$ value means that the amount of impurities in the polyketone is less and thermal deterioration is less.

(9) Strength and modulus of fibers:

The strength-elongation of fibers was measured in accordance with JIS-L-1013.

EXAMPLE 1

25 micromoles of palladium acetate, 30 micromoles of 1,3-bis{di(2-methoxyphenyl)phosphino}propane, 1 millimole of sulfuric acid and 2.5 millimoles of 1,4-benzoquinone were dissolved in 40 ml of acetone to prepare a catalyst solution. This catalyst solution was introduced into a stainless steel autoclave of 2000 ml in capacity which contained 1000 ml of methanol-water mixed solvent (containing 12 vol % of water). Before the introduction of the catalyst, the methanol-water mixed solvent in the autoclave was previously subjected to nitrogen replacement three times at 30° C. and 3 MPa.

After the autoclave was closed, the content was heated while stirring, and when the internal temperature reached 85° C., ethylene was added until the internal pressure reached 4.5 MPa and subsequently carbon monoxide was added until the internal pressure reached 9.0 MPa. Thereafter, a mixed gas comprising 1:1 of ethylene and carbon monoxide was continuously fed and stirring was continued for 4 hours while keeping the internal pressure at 9.0 MPa and the internal temperature at 85° C. After cooling, gas in the autoclave was purged and the content was taken out. The reaction solution was treated under the following conditions. The resulting polyketone suspension was subjected to centrifugal separation to prepare a wet polyketone powder containing 35 wt % of liquid component. The resulting polyketone powder was washed with 2 liters of methanol, and then again subjected to filtration and centrifugal separation to obtain a wet polyketone powder containing 30 wt % of liquid component. The powder was further washed with 2 liters of water at 35° C., then washed with 2 liters of methanol, and then subjected to centrifugal separation to obtain a wet polyketone powder containing 25 wt % of liquid component. This wet polyketone powder was dried at 80° C. for 4 hours under a nitrogen atmosphere to obtain 297 g of a polymer.

The measurements of $^{13}$C-NMR and IR revealed that the above polymer was a polyketone substantially comprising repeating units derived from carbon monoxide and repeating units derived from ethylene. The polyketone had a melting point of 261° C. The polymerization activity was 28.0 kg/g-Pd·hr, and the [η] was 6.2 dl/g. The content of Pd in this polyketone was 5 ppm and that of P was 3 ppm. The ratio of terminal group A/terminal group B was 2.2. The resulting polyketone had the average particle diameter of 0.5 mm and a bulk density of 27 g/100 ml.

This polyketone had a $UV_{min}$ of 0.11, a $Tm^3$ of 241° C. and a solution viscosity increasing rate of 32.0%, and further had good heat resistance.

EXAMPLE 2

In 4 ml of acetone were dissolved 1.25 micromole of palladium acetate, 1.5 micromole of 1,3-bis(diphenylphosphino)propane and 50 micromoles of sulfuric acid, to obtain a catalyst solution. This was dissolved in 50 ml of a methanol/water mixed solvent containing 2000 ppm of water, and this solution was introduced into a stainless steel autoclave of 100 ml in capacity which was subjected to nitrogen replacement.

Thereafter, the temperature was raised to 80° C., and ethylene was introduced until the internal pressure reached 4.5 MPa and subsequently carbon monoxide was introduced until the internal pressure reached 9.0 MPa. Thereafter, a mixed gas comprising 1:1 of ethylene and carbon monoxide was continuously fed, and polymerization was carried out for 4 hours in the same formulation as in Example 1 while keeping the internal pressure at 9.0 MPa and the internal temperature at 85° C., thereby obtaining 1.33 g of a polyketone. The polymerization activity was 20.0 kg/g-Pd·hr, and the [α] was 3.6 dl/g. The content of Pd in this polyketone was 9 ppm, and the ratio of terminal group A/terminal group B was 7.1. This polyketone had good heat resistance.

EXAMPLE 3

The polymerization was carried out in the same manner as in Example 1, except that the composition of the catalyst solution comprised 10 micromoles of palladium acetate, 12 micromoles of 1,3-bis{di(2-methoxyphenyl)phosphino}propane, 1 millimole of sulfuric acid and 5.0 millimoles of 1,4-benzoquinone, and that the polymerization time was 10 hours, whereby 274 g of polyketone was obtained. The polymerization activity was 25.7 kg/g-Pd·hr, and the [η] was 6.3 dl/g. The content of Pd in this polyketone was 2 ppm, and the ratio of terminal group A/terminal group B was 2.0. This polyketone had good heat resistance.

EXAMPLE 4

The reaction was carried out in the same manner as in Example 1, except that the composition of the catalyst solution comprised 15 micromoles of palladium acetate, 18 micromoles of 1,3-bis{di(2-methoxyphenyl)phosphino}propane, 1 millimole of sulfuric acid and 7.5 millimoles of 1,4-benzoquinone, and that before starting the polymerization, ethylene was added until the internal pressure reached 5.0 MPa, and then carbon monoxide was added until the internal pressure reached 9.0 MPa, whereby 199 g of polyketone was obtained. The polymerization activity was 31.2 kg/g-Pd·hr, and the [η] was high, namely, 6.4 dl/g. The content of Pd in this polyketone was 3 ppm, and the ratio of terminal group A/terminal group B was 1.9. This polyketone was excellent in both of the $Tm^3$ and solution viscosity increasing rate and had excellent heat resistance.

EXAMPLE 5

The reaction was carried out in the same manner as in Example 4, except that before starting the polymerization, ethylene was added until the internal pressure reached 5.0 MPa, and then carbon monoxide was added until the internal pressure reached 7.0 MPa, followed by starting the polymerization, whereby 153 g of polyketone was obtained. The polymerization activity was 24.0 kg/g-Pd·hr, and the [η] was 2.7 dl/g. The content of Pd in this polyketone was 8 ppm, and the ratio of terminal group A/terminal group B was 1.3. This polyketone was excellent in the heat resistance.

EXAMPLE 6

The reaction was carried out in the same manner as in Example 5, except that before starting the polymerization, ethylene was added until the internal pressure reached 5.5 MPa, then carbon monoxide was added until the internal pressure reached 7.0 MPa, and the polymerization was started, whereby 119 g of polyketone was obtained. The polymerization activity was 18.7 kg/g-Pd·hr, and the [η] was 2.6 dl/g. The content of Pd in this polyketone was 9 ppm, and the ratio of terminal group A/terminal group B was 0.9. This polyketone was excellent in both of the $Tm^3$ and the solution viscosity increasing rate.

EXAMPLE 7

Into a Hastelloy autoclave of 500 ml in capacity which contained 250 ml of methanol and was subjected to nitrogen substitution were introduced 20.0 ml of a catalyst solution (acetone/methanol/water=10 ml/9.9 ml/0.1 ml) containing 3.125 micromoles of palladium acetate, 3.75 micromoles of 1,3-bis(diphenylphosphino)propane, 50 micromoles of sulfuric acid and 1.25 millimole of 1,4-benzoquinone. Thereafter, the temperature was raised to 85° C., and a mixed gas comprising 1:1 of ethylene and carbon monoxide was introduced so that the internal pressure reached 12 MPa, and subsequently polymerization was carried out for 2 hours in the same formulation as in Example 1 while keeping the internal pressure at 12.0 MPa and the internal temperature at 85° C. The polymerization activity was 27.5 kg/g-Pd·hr, and the [η] was 3.2 dl/g. The content of Pd in this polyketone was 15 ppm, and the ratio of terminal group A/terminal group B was 7.5. This polyketone had good heat resistance.

EXAMPLE 8

The polymerization was carried out in the same manner as in Example 7, except that the polymerization pressure was 24.0 MPa. The polymerization activity was 40.6 kg/g-Pd·hr, and the [η] was 7.0 dl/g. The content of Pd in this polyketone was 11 ppm, and the ratio of terminal group A/terminal group B was 2.7. This polyketone had good heat resistance.

EXAMPLE 9

The polymerization was carried out in the same manner as in Example 7, except that the polymerization solvent was isopropanol, the polymerization temperature was 95° C., and the polymerization pressure was 15.0 MPa. The polymerization activity was 25.0 kg/g-Pd·hr, and the [η] was 4.8 dl/g. The content of Pd in this polyketone was 18 ppm. The terminal group A had 95% of an isopropyl ester terminal and 5% of a methyl ester terminal in the equivalent ratio, and the ratio of terminal group A/terminal group B was 1.9. This polyketone had good heat resistance.

EXAMPLE 10

The polymerization was carried out in the same manner as in Example 9, except that the polymerization temperature was 100° C., the polymerization pressure was 20.0 MPa and the polymerization time was 3 hours. The polymerization activity was 24.8 kg/g-Pd·hr, and the [η] was 5.5 dl/g. The content of Pd in this polyketone was 13 ppm. The terminal group A had 97% of an isopropyl ester terminal and 3% of a methyl ester terminal in the equivalent ratio, and the ratio of terminal group A/terminal group B was 1.6. This polyketone had good heat resistance.

EXAMPLE 11

The polymerization was carried out in the same manner as in Example 1, except that the polymerization temperature was 100° C. and the polymerization time was 2 hours. The polymerization activity was very high, namely, 61.4 kg/g-Pd·hr, and the [η] was 3.6 dl/g. The content of Pd in this polyketone was 5 ppm, and the ratio of terminal group A/terminal group B was 5.7. This polyketone was excellent in both of the $Tm^3$ and the solution viscosity increasing rate.

EXAMPLE 12

The reaction was carried out in the same manner as in Example 1, except that 500 micromoles of trifluoroacetic acid was used in place of sulfuric acid, methanol containing 90 ppm of water was used as the polymerization solvent, the polymerization temperature was 70° C., the polymerization pressure was 9.0 MPa (ethylene was introduced until 2.3 MPa was reached, and then a mixed gas containing ethylene:carbon monoxide at 1:1 was introduced until 9.0 MPa was reached), and the polymerization time was 4 hours. The polymerization activity was 12.8 kg/g-Pd·hr, and the [η] was 13.9. The content of Pd in this polyketone was 18 ppm, and the ratio of terminal group A/terminal group B was 2.4. This polyketone was excellent in both of the $Tm^3$ and the solution viscosity increasing rate.

EXAMPLE 13

The reaction was carried out in the same manner as in Example 1, except that ethanol containing 20 vol % of water was used as the polymerization solvent, whereby 321 g of polyketone was obtained. The polymerization activity was 30.1 kg/g-Pd·hr, and the [η] was 6.5 dl/g. The content of Pd in this polyketone was 5 ppm, and that of P was 4 ppm. Only the ethyl ester terminal was observed in the terminal group A, and the ratio of terminal group A/terminal group B was 2.7. This polyketone was excellent in both of the $Tm^3$ and the solution viscosity increasing rate.

EXAMPLE 14

The polymerization was carried out in the same manner as in Example 1, except that methanesulfonic acid was used in place of sulfuric acid, naphthoquinone was used in place of benzoquinone, and methanol containing 0.1 vol % of water was used as the polymerization solvent, whereby 227 g of polyketone was obtained. The polymerization activity was 21.3 kg/g-Pd·hr, and the [η] was 6.3 dl/g. The content of Pd in this polyketone was 7 ppm, and that of P was 10 ppm. The ratio of terminal group A/terminal group B was 2.5. This polyketone was excellent in both of the $Tm^3$ and the solution viscosity increasing rate.

COMPARATIVE EXAMPLE 1

In 500 ml of acetone were dissolved 1.65 millimoles of palladium acetate, 1.98 millimole of 1,3-bis{di(2-methoxyphenyl)phosphino}propane, 33.0 millimoles of trifluoroacetic acid and 330 millimoles of 1,4-benzoquinone, thereby obtaining a catalyst solution. This catalyst solution was introduced into a stainless steel autoclave of 55 liters in capacity which contained 27 liters of methanol. Before the introduction of the catalyst, the methanol in the autoclave was previously subjected to nitrogen replacement three times at 30° C. and 3 MPa.

After the autoclave was closed, the content was heated while stirring, and when the internal temperature reached 80° C., a mixed gas comprising 1:1 of ethylene and carbon monoxide was continuously fed to increase the internal pressure to 5.5 MPa, and then stirring was continued for 1 hour while keeping the internal pressure at 5.5 MPa and the internal temperature at 80° C. After cooling, gas in the autoclave was purged and the content was taken out. The reaction solution was filtered, washed with 36 liters of methanol, and then dried under reduced pressure to obtain 879 g of a polymer. The polymerization activity was 5.0 kg/g-Pd·hr, the [η] was 4.6 dl/g, the average particle diameter was 1.5 mm, and the bulk density was 21 g/100 ml.

The content of Pd and that of P in the polyketone were considerably large, namely, 155 ppm and 130 ppm, respectively, which were outside the scope of the present invention. In the heat resistance test, this polyketone showed a $Tm^3$ of 215° C. and a solution viscosity increasing rate of 105.5%, which were both extremely bad.

COMPARATIVE EXAMPLE 2

The reaction was carried out in the same manner as in Comparative Example 1, except that the reaction time was 4 hours, to obtain 3374 g of a polymer. The polymerization activity was 4.8 kg/g-Pd·hr, and the [η] was 5.9 dl/g. The content of Pd and that of P in the polyketone were considerably large, namely, 44 ppm and 30 ppm, respectively, which were outside the scope of the present invention. This polyketone was inferior in both of the heat resistance and the solution viscosity increasing rate.

COMPARATIVE EXAMPLE 3

The reaction was carried out in the same manner as in Comparative Example 2, except that methanol containing 75 vol % of water was used as the polymerization solvent, to obtain 12.2 g of a polymer. The polymerization activity was 15.3 kg/g-Pd·hr. The [η] was 2.1 dl/g, which was insufficient.

COMPARATIVE EXAMPLE 4

The polymerization was carried out in the same manner as in Example 1, except that trifluoroacetic acid was used in place of sulfuric acid as an acid, 1,3-bis(diphenylphosphino) propane was used as the phosphorus ligand, methanol was used as the polymerization solvent, the polymerization temperature was 90° C., and the polymerization pressure was 5.5 MPa (a mixed gas comprising 1:1 of ethylene/carbon monoxide). The polymerization activity was 10.5 kg/g-Pd·hr, and the [η] was 0.9 dl/g, which was insufficient as raw materials for industrial materials and outside the scope of the present invention. The amount of Pd in this polyketone was 75 ppm, which was very large. The ratio of terminal group A/terminal group B was also high, namely, 8.9, which was outside the scope of the present invention. This polyketone was conspicuously bad in the heat resistance.

COMPARATIVE EXAMPLE 5

The reaction for 4 hours was carried out in the same manner as in Example 1, except that 50 micromoles of palladium acetate, 60 micromoles of 1,3-bis(diphenylphosphino)propane, 1 millimole of trifluoroacetic acid and 10 millimoles of 1,4-benzoquinone were dissolved in 80 milliliters of acetone to prepare a catalyst solution, methanol was used as the polymerization solvent, ethylene was introduced until the internal pressure reached 3.5 MPa, then carbon monoxide was introduced until the internal pressure reached 7.0 MPa, and the reaction was started and carried out under an internal pressure of 7.0 MPa and at a temperature of 90° C. As a result, 328 g of a polyketone was obtained.

The polymerization activity was 9.8 kg/g-Pd·hr, the content of Pd in this polyketone was 21 ppm and that of P was 15 ppm, and the ratio of terminal group A/terminal group B was 2.9. The [η] was 1.9 dl/g, which was insufficient and outside the scope of the present invention.

COMPARATIVE EXAMPLE 6

The reaction of 4 hours, and the washing and drying were carried out in the same manner as in Comparative Example 2, except that 27 liters of acetone was used as the polymerization solvent and the washing after polymerization was carried out with 36 liters of acetone, thereby obtaining 492 g of polyketone having a [η] of 6.7 dl/g. The polymerization activity was 0.7 kg/g-Pd·hr, which was utterly insufficient. The content of Pd and that of P in this polyketone were considerably large, namely, 280 ppm and 90 ppm, respectively, which were outside the scope of the present invention. According to the observation by NMR, it was confirmed that this polyketone had no alkyl ester terminal group (terminal group A). This polyketone was considerably bad in the heat resistance.

COMPARATIVE EXAMPLE 7

The reaction of 4 hours, and the washing and drying were carried out in the same manner as in Comparative Example 2, except that 27 liters of methyl ethyl ketone containing 12 vol % of water was used as the polymerization solvent and the washing after the polymerization was carried out with 36 liters of methyl ethyl ketone, thereby to obtain 2320 g of a polyketone having a [η] of 6.5 dl/g. The polymerization activity was 3.3 kg/g-Pd·hr. The content of Pd in this polyketone was large, namely, 45 ppm, which was outside the scope of the present invention. According to the observation by NMR, it was confirmed that this polyketone had no alkyl ester terminal group (terminal group A). This polyketone was insufficient in the heat resistance.

COMPARATIVE EXAMPLE 8

The reaction of 4 hours, and the washing and drying were carried out in the same manner as in Comparative Example 2, except that 27 liters of 1-octanol containing 12 vol % of water was used as the polymerization solvent, the washing after the polymerization was carried out with 36 liters of 1-octanol and successively washing was carried out with 27 liters of methanol, thereby to obtain a polyketone having a [η] of 7.7 dl/g. The polymerization activity was 1.2 kg/g-Pd·hr. The content of Pd in this polyketone was large, namely, 138 ppm, which was outside the scope of the present invention, and the polyketone was insufficient in the heat resistance.

COMPARATIVE EXAMPLE 9

The polymerization of 4 hours was carried out in the same formulation as of Comparative Example 4, followed by cooling. When the internal temperature lowered to 60° C., the internal pressure was reduced to 0.3 MPa and purging with nitrogen was carried out, followed by charging of 500 milliliters of acetone solution containing 33 millimoles of 1,3-bis{di(2-methoxyphenyl) phosphino}propane. After the charging, successively the internal temperature was raised to 110° C., followed by stirring for 15 minutes. After the termination of the stirring, cooling was again carried out, then gas in the autoclave was purged, and the content was taken out. The obtained reaction mixture was subjected to filtration, to washing of three stages, namely, washing with 5 liters of methanol, 3 liters of acetone and additionally 3 liters of methanol, and then to drying under reduced pressure, thereby to obtain a polymer.

The content of Pd and that of P in this polyketone decreased to 12 ppm and 20 ppm by the after-treatment, respectively. However, the [η] was 0.9, which was outside the scope of the present invention. This polyketone was improved in the dry heat resistance than that of Comparative Example 4, but was considerably bad in the solvent heat resistance (solution viscosity increasing rate).

COMPARATIVE EXAMPLE 10

The polymerization was carried out in the same formulation as in Comparative Example 6. 10 liters of a polyketone-acetone suspension taken out after the completion of the reaction was washed with 20 liters of 2,4-pentanedione and filtered. Thereafter, the polymer was added to 20 liters of 2,4-pentanedione, followed by subjecting to a treatment at 120° C. for 6 hours with stirring, and washing with methanol and drying under reduced pressure to obtain a polymer.

This polyketone had a [η] of 6.7, which was nearly the same as that of Comparative Example 6, but the content of Pd and that of P decreased to 9 ppm and 13 ppm by the after-treatment, respectively. However, this polyketone had no terminal group A (namely, the ratio of terminal group A/terminal group B being 0.0), which was outside the scope of the present invention. This polyketone was improved in the heat resistance as compared with the polyketone of Comparative Example 6, but was considerably bad in the solution viscosity increasing rate.

COMPARATIVE EXAMPLE 11

The polymerization was carried out in the same manner as in Comparative Example 1, except that the polymerization pressure was 4.0 MPa and the polymerization time was 4 hours. The polymerization activity was low, namely, 3.0 kg/g-Pd·hr, and the [η] was 5.3 dl/g, but the content of Pd was 81 ppm, which was outside the scope of the present invention. The ratio of terminal group A/terminal group B was 4.3, and the $Tm^3$ and the solution viscosity increasing rate were both bad.

COMPARATIVE EXAMPLE 12

The polymerization was carried out in the same manner as in Comparative Example 1, except that 1,3-bis(diphenylphosphino)propane was used as the ligand, the polymerization temperature was 45° C., the polymerization pressure was 5.5 MPa and the polymerization time was 22 hours. The polymerization activity was very low, namely, 1.0 kg/g-Pd·hr. The resulting polyketone had a [η] of 6.3 dl/g, but the content of Pd was 43 ppm, which was outside the scope of the present invention. The ratio of terminal group A/terminal group B was 6.9, and the $Tm^3$ and the solution viscosity increasing rate were both considerably bad.

COMPARATIVE EXAMPLE 13

The polymerization was carried out in the same manner as in Comparative Example 2, except that nickel acetate was used in place of palladium acetate, 1,2-bis{di(2-methoxyphenyl)}ethane was used as the ligand, the polymerization temperature was 85° C., the polymerization pressure was 7.0 MPa (a mixed gas comprising 1:1 of ethylene/carbon monoxide) and the polymerization time was 0.5 hour. As a result, only a trace amount of polyketone was obtained.

The results of the above Examples are shown in Table 1 and Table 2, and the results of the above Comparative Examples are shown in Table 3 and Table 4.

TABLE 1

|  | Polymerization temperature ° C. | Polymerization pressure MPa | Polymerization organic solvent | Water content (ppm) | Polymerization time hr | Polymerization activity kg/g-Pd · hr | Catalyst efficiency kg/g-Pd | [η] dl/g |
|---|---|---|---|---|---|---|---|---|
| Example 1 | 85 | 9.0 | Methanol | 115385 | 4 | 28.0 | 112.0 | 6.2 |
| Example 2 | 80 | 9.0 | Methanol | 1852 | 4 | 20.0 | 80.0 | 3.6 |
| Example 3 | 85 | 9.0 | Methanol | 115385 | 10 | 25.7 | 257.0 | 6.3 |
| Example 4 | 85 | 9.0 | Methanol | 115385 | 4 | 31.2 | 124.8 | 6.4 |
| Example 5 | 85 | 7.0 | Methanol | 115385 | 4 | 24.0 | 96.0 | 2.7 |
| Example 6 | 85 | 7.0 | Methanol | 115385 | 4 | 18.7 | 74.8 | 2.6 |
| Example 7 | 85 | 12.0 | Methanol | 370 | 2 | 27.5 | 55.0 | 3.2 |
| Example 8 | 85 | 24.0 | Methanol | 370 | 2 | 40.6 | 81.2 | 7.0 |
| Example 9 | 95 | 15.0 | Isopropanol | 370 | 2 | 25.0 | 50.0 | 4.8 |
| Example 10 | 100 | 20.0 | Isopropanol | 370 | 3 | 24.8 | 74.4 | 5.5 |
| Example 11 | 100 | 9.0 | Methanol | 115385 | 2 | 61.4 | 122.8 | 3.6 |
| Example 12 | 70 | 9.0 | Methanol | 87 | 4 | 12.8 | 51.2 | 13.9 |
| Example 13 | 85 | 9.0 | Ethanol | 192308 | 4 | 30.1 | 120.4 | 6.5 |
| Example 14 | 85 | 9.0 | Methanol | 3846 | 4 | 21.3 | 85.2 | 6.3 |

TABLE 2

|  | Content of element in polymer (ppm) | | Structure of terminal | Ratio of terminal groups Terminal group A/ | $Tm_3$ | Evaluation of heat | Solution viscosity increasing | Evaluation of solution heat resistance | UVmin |
|---|---|---|---|---|---|---|---|---|---|
|  | Pd | P | group A* | Terminal group B | ° C. | resistance | rate | abs | % |
| Example 1 | 5 | 3 | M | 2.2 | 241 | ◉ | ○ | 0.11 | 32.0 |
| Example 2 | 9 | 7 | M | 7.1 | 233 | ○ | ○ | 0.13 | 44.7 |
| Example 3 | 2 | 1 | M | 2.0 | 245 | ◉ | ◉ | 0.14 | 29.3 |
| Example 4 | 3 | 2 | M | 1.9 | 244 | ◉ | ◉ | 0.10 | 27.5 |
| Example 5 | 8 | 5 | M | 1.3 | 242 | ◉ | ○ | 0.11 | 34.5 |
| Example 6 | 9 | 6 | M | 0.9 | 240 | ◉ | ○ | 0.11 | 38.9 |
| Example 7 | 15 | 16 | M | 7.5 | 231 | ○ | ○ | 0.12 | 47.5 |
| Example 8 | 11 | 9 | M | 2.7 | 238 | ○ | ◉ | 0.10 | 27.5 |
| Example 9 | 18 | 15 | P | 1.9 | 232 | ○ | ◉ | 0.10 | 19.4 |
| Example 10 | 13 | 12 | P | 1.6 | 235 | ○ | ◉ | 0.10 | 20.1 |
| Example 11 | 5 | 4 | M | 5.7 | 233 | ○ | ○ | 0.13 | 39.3 |
| Example 12 | 18 | 13 | M | 2.4 | 233 | ○ | ◉ | 0.11 | 29.3 |
| Example 13 | 5 | 4 | E | 2.7 | 242 | ◉ | ○ | 0.11 | 42.5 |
| Example 15 | 7 | 10 | M | 2.5 | 240 | ◉ | ○ | 0.11 | 40.1 |

*Structure of terminal group A: M = Methyl ester terminal, E = Ethyl ester terminal, P = Isopropyl ester terminal

TABLE 3

|  | Polymerization temperature ° C. | Polymerization pressure MPa | Polymerization organic solvent | Water content (ppm) | Polymerization time hr | Polymerization activity kg/g-Pd · hr | Catalyst efficiency kg/g-Pd | [η] dl/g |
|---|---|---|---|---|---|---|---|---|
| Comparative Example 1 | 80 | 5.5 | Methanol | 0 | 1 | 5.0 | 5 | 4.6 |
| Comparative Example 2 | 80 | 5.5 | Methanol | 0 | 4 | 4.8 | 19.2 | 5.9 |
| Comparative Example 3 | 85 | 9.0 | Methanol | 694444 | 4 | 15.3 | 61.2 | 2.1 |
| Comparative Example 4 | 90 | 5.5 | Methanol | 0 | 1 | 10.5 | 10.5 | 0.9 |
| Comparative Example 5 | 85 | 9.0 | Methanol | 0 | 4 | 9.8 | 39.2 | 1.9 |

TABLE 3-continued

|  | Polymerization temperature ° C. | Polymerization pressure MPa | Polymerization organic solvent | Water content (ppm) | Polymerization time hr | Polymerization activity kg/g-Pd · hr | Catalyst efficiency kg/g-Pd | [η] dl/g |
|---|---|---|---|---|---|---|---|---|
| Comparative Example 6 | 80 | 5.5 | Acetone | 0 | 4 | 0.7 | 2.8 | 6.7 |
| Comparative Example 7 | 80 | 5.5 | Methyl ethyl ketone | 117818 | 4 | 3.3 | 13.2 | 6.5 |
| Comparative Example 8 | 80 | 5.5 | 1-Octanol | 117818 | 4 | 1.2 | 4.8 | 7.7 |
| Comparative Example 9 |  |  | Methanol | 0 |  |  |  | 0.9 |
| Comparative Example 10 |  |  | Acetone | 0 |  |  |  | 6.7 |
| Comparative Example 11 | 80 | 4.0 | Methanol | 0 | 4 | 3.0 | 12.0 | 5.3 |
| Comparative Example 12 | 45 | 5.5 | Methanol | 0 | 22 | 1.0 | 22.0 | 6.3 |
| Comparative Example 13 | 85 | 7.0 | Methanol | 1852 | 0.5 | 0.0 | 0.0 | — |

TABLE 4

|  | Content of element in polymer (ppm) | | Structre of terminal group A* | Ratio of terminal groups Terminal group A/ Terminal group B | Tm₃ ° C. | Evaluation of heat resistance | Solution viscosity increasing rate % | Evaluation of solution heat resistance | UVmin abs |
|---|---|---|---|---|---|---|---|---|---|
|  | Pd | P |  |  |  |  |  |  |  |
| Comparative Example 1 | 155 | 130 | M | 4.9 | 215 | X | 105.5 | X | 0.17 |
| Comparative Example 2 | 44 | 30 | M | 3.3 | 231 | ○ | 57.1 | Δ | 0.15 |
| Comparative Example 3 | 15 | 11 | M | 5.6 | 230 | ○ | 51.2 | Δ | 0.13 |
| Comparative Example 4 | 75 | 66 | M | 8.9 | 211 | X | 125.9 | X | 0.14 |
| Comparative Example 5 | 21 | 15 | M | 2.9 | 233 | ○ | 60.1 | Δ | 0.15 |
| Comparative Example 6 | 280 | 90 | — | 0.0 | n.d. | X | 96.5 | Δ | 0.18 |
| Comparative Example 7 | 45 | 25 | — | 0.0 | 223 | Δ | 22.3 | ◎ | 0.16 |
| Comparative Example 8 | 138 | 120 | — | 0.0 | n.d. | X | 38.5 | ○ | 0.19 |
| Comparative Example 9 | 12 | 20 | M | 8.9 | 219 | X | 188.0 | X | 0.15 |
| Comparative Example 10 | 9 | 5 | — | 0.0 | 235 | ○ | 150.1 | X | 0.17 |
| Comparative Example 11 | 81 | 55 | M | 4.3 | 213 | X | 77.0 | Δ | 0.16 |
| Comparative Example 12 | 43 | 33 | M | 6.9 | n.d. | X | 85.2 | Δ | 0.16 |
| Comparative Example 13 | — | — | — | — | — | — | — | — | — |

*Structure of terminal group A: M = Methyl ester terminal, E = Ethyl ester terminal, P = Isopropyl ester terminal, — = Structure corresponding to terminal group A was not observed.
n.d.: Peak was not observed.

The polyketones obtained in Examples 1-14 had the [η], content of Pd element and terminal group ratio which are within the scope of claim of the present invention, and were excellent in both of the dry heat resistance and the solvent heat resistance (solution viscosity increasing rate). On the other hand, as for the polyketones of Comparative Examples 1-13, at least one of the [η], content of Pd element and terminal group ratio was outside the scope of the present invention, and these polyketones were inferior in one or both of the dry heat resistance and the solvent heat resistance (solution viscosity increasing rate) to those of the present invention.

EXAMPLE 15

The polyketone polymerized in Example 3 was dissolved in an aqueous solution containing 30 wt % of calcium chloride/22 wt % of zinc chloride/10 wt % of lithium chloride to obtain a dope having a polyketone concentration of 6.5 wt %. The resulting dope was heated to 80° C., and extruded from a spinneret having a spinneret diameter of 0.15 mmϕ and 250 holes into a coagulating bath comprising water of −2° C. containing 2 wt % of calcium chloride, 1.1 wt % of zinc chloride, 0.5 wt % of lithium chloride and 0.1 wt % of hydrochloric acid after the dope was passed through an air gap of 10 mm. Spinnability was satisfactory, and there occurred no troubles, such as the increase of extrusion pressure, clogging of spinneret and breakage of filaments during the spinning for 6 hours.

Subsequently, the filaments were washed with a 0.1 wt % aqueous hydrochloric acid solution of 40° C. for 1 minute and furthermore with water of 40° C. for 1 minute. Then, 0.05 wt % (based on polyketone) of each of IRGANOX (trademark, manufactured by Ciba Specialty Chemicals Co., Ltd.) 1098 and IRGANOX (trademark, manufactured by Ciba Specialty Chemicals Co., Ltd.) 1076 were applied to the filaments and then the filaments were dried at 225° C. with fixing the length.

To the resulting dried fibers was applied an aqueous dispersion of stearyl phosphate potassium salt, and subsequently the fibers were subjected to four-stage stretching of 6.5 times/ 1.5 time/1.3 time/1.2 time, namely, 15.2 times in the total, at the respective temperatures of 225° C./240° C./250° C./257° C. to obtain polyketone fibers having a total fineness of 250 dtex. The resulting fibers had a melting point of 268° C., a strength of 17.5 cN/dtex, an elongation of 5.6% and a elastic modulus of 365 cN/dtex, and thus had extremely excellent thermal and mechanical characteristics as industrial materials.

The polyketone fibers had an intrinsic viscosity of 3.7, and the contents of metal elements remaining in the fibers were measured to find that the content of Pd element was 2 ppm, that of Zn element was 9 ppm and that of Ca element was 8 ppm, namely, the fibers contained only a small amount of remaining metals. Furthermore, the fibers were subjected to Soxhlet extraction with methyl ethyl ketone at 80° C. for 4 hours to extract and remove the heat stabilizer, and then the terminal structure was measured to find that the equivalent ratio of terminal group A/terminal group B was 2.1.

COMPARATIVE EXAMPLE 14

The polyketone polymerized in Comparative Example 1 was subjected to spinning, washing, drying and stretching by the same methods and under the same conditions as in Example 15. Increase of the extrusion pressure of 80% was observed during the spinning for 6 hours, and the dope extruded from the spinneret was colored yellow after 6 hours. There was no problem in spinnability for 3 hours after the starting of spinning, but after lapse of 3 hours, breakage of single filament was observed 8 times in total. Furthermore, during the stretching process, there often occurred fluffing or breakage of single filaments spun from the dope extruded after 3 hours from the starting of spinning.

The resulting fibers had a total fineness of 260 cN/dtex, a melting point of 267° C., a strength of 15.2 cN/dtex, an elongation of 5.1% and a modulus of 355 cN/dtex. The [η] of the fibers was 2.7, and as for the contents of metal elements remaining in the fibers, the amount of Pd element was 145 ppm, that of Zn element was 30 ppm and that of Ca element was 20 ppm, namely, they contained extremely large amounts of metal elements. Furthermore, when the terminal structure was measured by carrying out the same treatment as in Example 8, the equivalent ratio of terminal group A/terminal group B was 4.3.

COMPARATIVE EXAMPLE 15

The polyketone polymerized in Comparative Example 2 was subjected to spinning, washing, drying and stretching by the same methods and under the same conditions as in Example 15. Clogging of spinneret or breakage of filaments was not observed during the spinning during the 6 hours, but increase of the extrusion pressure of 15% was observed during the 6 hours, and the dope extruded from spinneret after the 6 hours was colored yellow.

The resulting fibers had a total fineness of 252 cN/dtex, a melting point of 268° C., a strength of 17.3 cN/dtex, an elongation of 5.6% and a modulus of 366 cN/dtex. The fibers had a [η] of 3.2, and as for the contents of metal elements remaining in the fibers, the content of Pd element was 40 ppm, that of Zn element was 22 ppm and that of Ca element was 15 ppm, namely, they contained large amounts of metal elements. The equivalent ratio of terminal group A/terminal group B was 3.1.

COMPARATIVE EXAMPLE 16

The spinning, drying and stretching of the polyketone polymerized in Comparative Example 5 were carried out in the same manner as in Example 1, except that the polymer concentration was 22 wt %. The spinnability was extremely inferior, and since the molecular weight was too low, the coagulated filaments were low in the strength and the breakage of single filaments and cutting of filaments often occurred during taking up from the coagulating bath. Moreover, since cutting of filaments occurred by the stretching at a high stretching ratio, the stretching conditions were changed to 6 times/1.5 time/1.25 time at respective temperatures of 225° C./240° C./255° C., namely, 3-stage stretching of 11.3 times in total.

The resulting fibers had a total fineness of 1210 cN/dtex, a melting point of 263° C., a strength of 8.2 cN/dtex, an elongation of 7.4% and a modulus of 159 cN/dtex, which were insufficient. The fibers had an equivalent ratio of terminal group A/terminal group B of 2.3, and as for the contents of metal elements remaining in the fibers, the content of Pd element was 10 ppm, that of Zn element was 18 ppm and that of Ca element was 10 ppm, but the [η] was 1.2, which was utterly insufficient.

EXAMPLE 16

Six polyketone fibers produced in Example 15 were subjected to doubling, and the resulting yarn was subjected to first Z-twisting and two of the yarns were folded and subjected to final S-twisting to make a gray cord (first twist/final twist were both 390 T/m) using a ring twister manufactured by Kaji Tekko Co., Ltd. This gray cord was immersed in an RFL solution having the following composition and thereafter was subjected to stepwise heat treatments of 120 seconds under a tension of 3 N at 160° C., 60 seconds under a tension of 4.2 N at 220° C., and 60 seconds under a tension of 2.8 N at 220° C. to obtain a cord.

| (Composition of RFL solution) | |
| --- | --- |
| Resorcinol | 22.0 parts |
| Formalin (30 mass %) | 30.0 parts |
| Sodium hydroxide (10 mass %) | 14.0 parts |
| Water | 570.0 parts |
| Vinylpyridine latex (41 mass %) | 364.0 parts |

The resulting polyketone cord had extremely excellent mechanical characteristics and dimensional stability, namely, a tensile strength of 11.8 cN/dtex, an intermediate elongation of 3.1%, and a dry heat shrinkage of 0.4%. The cords were disposed in the form of upper and lower two layers at 25 cords/inch in an unvulcanized rubber comprising 70% of natural rubber, 15% of SBR and 15% of carbon black, and vulcanization was carried out at 135° C. and 35 kg/cm² for 40 minutes to obtain a belt of 8 mm thick. The belt was subjected to a flex test at 100 rpm with applying a load of 10 kg. The belt was not broken even at the test of 8 hours, and was endurable against a high load. The cords drawn out of the belt after being subjected to fatigue test maintained 60% of the strength of the cords before the fatigue test.

INDUSTRIAL APPLICABILITY

The polyketone of the present invention can be produced through a short-time polymerization step and is obtained by a method of high productivity without excessive washing steps. The polyketone can exhibit excellent mechanical and thermal characteristics, such as high strength, high elastic modulus and high temperature, and is excellent in the heat resistance and solvent resistance at the time of molding, such as heating and dissolution in solvent, is hardly deteriorated during production, and can provide moldings excellent in thermal characteristics with stable quality. The polyketone moldings of the present invention can be used in any forms such as fibers and films, and can be applied to a wide variety of the uses such as clothing, reinforcing materials for rubbers, resins, cements, and optical fibers, electronic materials, battery materials, civil engineering materials, medical materials, daily commodities, fishery materials, and packaging materials.

The invention claimed is:

1. A polyketone obtained by polymerization in a liquid medium containing an alcohol of 1-6 carbon atoms and water and having a water content, as represented by the following Expression 1, of 10-500,000 ppm, comprising repeating units, 95-100 mole % of which are 1-oxotrimethylene represented by formula (1) and having an intrinsic viscosity of 2.5-20 dl/g, wherein the content of Pd element is 0-20 ppm, terminal structures include an alkyl ester group (terminal group A) represented by the formula (2) and an alkyl ketone group (terminal group B) represented by formula (3), and the equivalent ratio of terminal group A/terminal group B is 0.1-8.0:

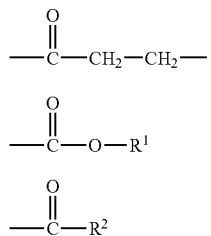

(wherein $R^1$ is hydrocarbon of 1-6 carbon atoms and $R^2$ is an organic group of 1-10 carbon atoms), Expression 1:

$$\text{Water content }(ppm) = \frac{\text{Mass of water }(g)}{\text{Volume of polymerization solvent other than water (ml)} + \text{Volume of water (ml)}} \times 10^6$$

(the volumes in the denominator of the right side are values at 25° C.).

2. A polyketone according to claim 1, wherein the intrinsic viscosity is 4.0-8.0 dl/g, the equivalent ratio of terminal group A/terminal group B is 0.5-3.0, and the content of Pd element is 0-10 ppm.

3. A polyketone according to claim 1 wherein the content of carboxylic acid terminal group is 0-10 milli-equivalent/kg.

4. A polyketone according to claim 1 or 3, which has a DSC melting point $Tm^3$ of 230° C. or higher.

5. A polyketone according to claim 1 or 3, which has a DSC melting point $Tm^3$ of 240° C. or higher.

6. A polyketone according to claim 1 or 3, wherein the terminal group A is a methyl ester group represented by the following formula (4), the terminal group B is an ethyl ketone group represented by the following formula (5), and the equivalent ratio of terminal group A/terminal group B is 1.0-8.0:

7. A polyketone according to claim 1 or 3, wherein the terminal group A is an isopropyl ester group represented by the formula (6), the terminal group B is an ethyl ketone group represented by the formula (5), and the equivalent ratio of terminal group A/terminal group B is 0.5-2.5:

8. A polyketone according to claim 1 or 3, wherein when the polyketone is dissolved in hexafluoroisopropanol at a concentration of 0.1 wt % and ultraviolet spectrum of the solution is measured in a quarts cell at a scanning speed of 200 nm/mm and a data intake interval of 0.5 nm, the minimum value of absorbance observed at a wavelength of 200-250 nm is 0.14 or less.

9. A polyketone molded product having repeating units, 95-100 mol % of which are 1-oxotrimethylene represented by the formula (1) and having an intrinsic viscosity of 2.5-20 dl/g, wherein the content of Pd element is 0-20 ppm and terminal structures include an alkyl ester group (terminal group A) represented by the formula (2) and an alkyl ketone group (terminal group B) represented by the formula (3), and the equivalent ratio of terminal group A/terminal group B is 0.1-8.0:

(wherein $R^1$ is hydrocarbon of 1-6 carbon atoms and $R^2$ is an organic group of 1-10 carbon atoms).

10. A polyketone fiber having repeating units, 95-100 mol % of which are 1-oxotrimethylene represented by the formula (1) and having an intrinsic viscosity of 2.5-20 dl/g, wherein the content of Pd element is 0-20 ppm and the terminal structures include an alkyl ester group (terminal group A) represented by the formula (2) and an alkyl ketone group (terminal group B) represented by the formula (3), and the equivalent ratio of terminal group A/terminal group B is 0.1-8.0:

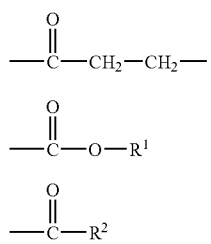

(wherein $R^1$ is hydrocarbon of 1-6 carbon atoms and $R^2$ is an organic group of 1-10 carbon atoms).

11. A tire cord comprising at least 50 wt % of the polyketone fiber according to claim 10.

12. A polyketone article, characterized in that the polyketone molded product according to claim 9 or the polyketone fiber according to claim 10 is at least partly used in the article.

13. A polyketone article according to claim 12 which is a tire, a belt or a constructional material.

14. A fiber-reinforced composite material comprising at least 1 wt % of the polyketone fiber according to claim 10 with respect to the whole fibers.

15. A method according to claim 1 for producing a polyketone having an intrinsic viscosity of 2.5-20 dl/g by copolymerizing carbon monoxide and an ethylenically unsaturated compound, wherein the copolymerization is carried out in the presence of a metal complex catalyst obtained by reacting the following compounds (a)-(c), in the following liquid medium (d), and under the following conditions (e):
(a) a palladium compound,
(b) a bidentate ligand having an atom of Group 15 elements,
(c) an acid having a pKa of 4 or less,
(d) a liquid medium containing an alcohol of 1-6 carbon atoms and water and having a water content, as represented by the following Expression 1, of 10- 500,000 ppm,
(e) a polymerization pressure P of 5 MPa or higher and a polymerization temperature T of 50-200° C., $$\text{Water content } (ppm) = \frac{\text{Mass of water } (g)}{\text{Volume of polymerization solvent other than water } (ml) + \text{Volume of water } (ml)} \times 10^6$$

(the volumes in the denominator of the right side are values at 25° C.).

16. A method for producing a polyketone according to claim 15, wherein the polymerization temperature is 70-200° C. and the polymerization pressure is 7 MPa or higher.

17. A method for producing a polyketone according to claim 15 or 16, wherein (a) is at least one palladium compound selected from the group consisting of palladium acetate, palladium trifluoroacetate, palladium acetylacetonate and palladium chloride;
(b) is at least one phosphorus bidentate ligand selected from the group consisting of 1,3-bis{di(2-methoxyphenyl)phosphino}propane, 1,3-bis(diphenylphosphino)propane, 1,2-bis[{di(2-methoxyphenyl)phosphino}methyl]benzene and 1,3-bis{di(2-methoxy-4-sodium sulfonate-phenyl) phosphino}propane;
(c) is at least one acid selected from the group consisting of sulfuric acid, methanesulfonic acid, trifluoromethanesulfonic acid and trifluoroacetic acid; and
(d) is a solvent containing at least one alcohol selected from the group consisting of methanol, ethanol, n-propanol and isopropanol.

18. A method for producing a polyketone according to claim 15, wherein the copolymerization is carried out in the presence of benzoquinone or naphthoquinone.

19. A method for producing a polyketone according to claim 15, wherein the molar ratio of ethylenically unsaturated compound/carbon monoxide in the reaction vessel is 1/1-5/1.

20. A method for producing a polyketone according to claim 15, wherein the amount of the palladium compound used is 0.01-10,000 micromoles per 1 liter of the polymerization solvent, and the amount of the bidentate ligand having an atom of Group 15 elements and the amount of the acid having a pKa of 4 or less are 0.1-10 moles and 0.1-10,000 moles, respectively, based on 1 mole of the palladium compound.

21. A method for producing a polyketone according to claim 15, wherein the content of the alcohol of 1-6 carbon atoms in the liquid medium (d) is 75 vol % or more.

22. A method for producing a polyketone according to claim 15, wherein the acid having a pKa of 4 or less is sulfuric acid and the polymerization solvent contains an alcohol of 1-6 carbon atoms and water, the water content being 10-500,000 ppm.

23. A method for producing a polyketone according to claim 15, wherein the polymerization pressure P (MPa) and the polymerization temperature T (° C.) satisfy both of the following Expressions 2 and 3:

$$P \geq 720 \times \exp(-0.0629 \times T) \qquad \text{Expression 2:}$$

$$P \geq 0.0179 \times \exp(0.0607 \times T). \qquad \text{Expression 3:}$$

24. A method according to claim 1 for producing a polyketone having an intrinsic viscosity of 3.0-20 dl/g by copolymerizing carbon monoxide and an ethylenically unsaturated compound, wherein the polymerization activity is 10 kg/g–Pd·hr or higher.

25. A method according to claim 1 for producing a polyketone having an intrinsic viscosity of 2.5-20 dl/g by copolymerizing carbon monoxide and an ethylenically unsaturated compound, wherein the polymerization activity is 20 kg/g–Pd·hr or higher and the catalyst efficiency (kg/g–Pd) expressed by the product of the polymerization activity and the polymerization time (hr) is 50 or higher.

* * * * *